(12) United States Patent
Hosomi

(10) Patent No.: US 7,181,292 B2
(45) Date of Patent: Feb. 20, 2007

(54) SYSTEM CONTROL METHOD, CONTROL PROCESSING SYSTEM, AND CONTROL PROCESSING APPARATUS

(75) Inventor: Takeo Hosomi, Tokyo (JP)

(73) Assignee: NEC Corporation, Tokyo (JP)

( * ) Notice: Subject to any disclaimer, the term of this patent is extended or adjusted under 35 U.S.C. 154(b) by 784 days.

(21) Appl. No.: 10/372,976

(22) Filed: Feb. 26, 2003

(65) Prior Publication Data

US 2003/0163650 A1     Aug. 28, 2003

(30) Foreign Application Priority Data

Feb. 27, 2002    (JP) .............................. 2002-052284

(51) Int. Cl.
*G05B 11/01*    (2006.01)
*G06F 5/00*    (2006.01)

(52) U.S. Cl. .......................................... 700/20; 710/52

(58) Field of Classification Search .................. 700/20, 700/2, 7, 11; 709/202; 710/52, 53, 307
See application file for complete search history.

(56) References Cited

U.S. PATENT DOCUMENTS

| | | | |
|---|---|---|---|
| 5,530,933 A | | 6/1996 | Frink et al. |
| 5,860,159 A | | 1/1999 | Hagersten |
| 5,983,326 A | | 11/1999 | Hagersten et al. |
| 6,067,590 A | * | 5/2000 | Pettey et al. ................. 710/100 |
| 6,282,583 B1 | * | 8/2001 | Pincus et al. ................. 713/375 |
| 6,442,642 B1 | * | 8/2002 | Brooks .......................... 710/305 |
| 6,877,060 B2 | * | 4/2005 | Hunsaker ....................... 710/310 |

FOREIGN PATENT DOCUMENTS

| | | |
|---|---|---|
| JP | 7-281956 | 10/1995 |
| JP | 10-143477 | 5/1998 |
| JP | 10-187470 | 7/1998 |
| JP | 2000-172656 | 6/2000 |
| JP | 2000-259596 | 9/2000 |

* cited by examiner

*Primary Examiner*—Thomas Pham
(74) *Attorney, Agent, or Firm*—Foley & Lardner LLP

(57) ABSTRACT

In a system control method, a transaction is transmitted from a control processing apparatus to remaining control processing apparatuses via a connection network, and held in a home reception buffer through a transmitting circuit. Transactions read out from the home reception buffer the respective reception buffers are ordered and output through an arbitrating circuit. Predetermined transactions are exchanged among the respective control processing apparatuses, and specific entries in which received transactions should be written and specific entries from which transactions should be output to the arbitrating circuit are determined through the transmitting circuit and the receiving circuits, thereby setting identical combinations of transactions which the arbitrating circuit is to read out from the home reception buffer and the plurality of reception buffers in all the control processing apparatuses. A control processing system and control processing apparatus are also disclosed.

3 Claims, 19 Drawing Sheets

LINK-SPECIFIC TRANSMISSION DELAY AMOUNT (UNIT: CLOCK)

| from \ to | CHIP (10-1) | CHIP (10-2) | CHIP (10-3) | CHIP (10-4) |
|---|---|---|---|---|
| CHIP (10-1) |  | 7 | 2 | 7 |
| CHIP (10-2) | 7 |  | 3 | 2 |
| CHIP (10-3) | 2 | 3 |  | 5 |
| CHIP (10-4) | 2 | 2 | 2 |  |

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|---|
| CHIP(10-1) | | | | | | | | | | | | | | | | | | | | | | | | | | |
| SWP REGISTER (43) OF TRANSMITTING CIRCUIT (21) | - | - | - | - | - | - | - | - | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-2) | - | - | - | - | - | - | - | - | - | - | - | - | - | 6 | - | 0 | 1 | 2 | 3 | 4 | 5 | 6 | 7 | 8 | 9 | 10 |
| WP REGISTER (33) OF RECEIVING CIRCUIT (22-3) | - | - | - | - | - | - | 0 | 1 | 2 | 3 | 4 | - | 8 | 9 | 10 | 11 | 12 | 13 | 14 | 15 | -8 | -7 | -6 | -5 | -4 | - |
| WP REGISTER (33) OF RECEIVING CIRCUIT (22-4) | - | - | - | - | - | - | - | - | - | - | 0 | - | 3 | 4 | 5 | 6 | 7 | 8 | 9 | 10 | 11 | 12 | 13 | 14 | 15 | - |
| CHIP(10-2) | | | | | | | | | | | | | | | | | | | | | | | | | | |
| SWP REGISTER (43) OF TRANSMITTING CIRCUIT (21) | - | - | - | - | - | - | - | - | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | - | - | - | - | - | - | - | - | - | - | - | - | - | 6 | - | 0 | 1 | 2 | 3 | 4 | 5 | 6 | 7 | 8 | 9 | 10 |
| WP REGISTER (33) OF RECEIVING CIRCUIT (22-3) | - | - | - | - | - | 0 | - | - | 1 | 2 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-4) | - | - | - | - | - | - | - | - | - | - | 0 | - | 2 | 3 | 4 | 5 | 6 | 7 | 8 | 9 | 10 | 11 | 12 | 13 | 14 | 15 |
| CHIP(10-3) | | | | | | | | | | | | | | | | | | | | | | | | | | |
| SWP REGISTER (43) OF TRANSMITTING CIRCUIT (21) | - | 0 | 1 | 2 | 3 | 4 | 5 | - | 6 | - | 7 | 8 | 9 | 10 | 11 | 12 | 13 | 14 | 15 | -8 | -7 | -6 | -5 | -4 | -3 | -2 |
| WP REGISTER (33) OF RECEIVING CIRCUIT (22-1) | - | - | - | - | - | - | - | - | - | - | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-2) | - | - | - | - | - | - | - | - | - | - | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-4) | - | - | - | - | - | - | - | - | - | - | 0 | 1 | 2 | 3 | 4 | 5 | 6 | 7 | 8 | 9 | 10 | 11 | 12 | 13 | 14 | 15 |
| CHIP(10-4) | | | | | | | | | | | | | | | | | | | | | | | | | | |
| SWP REGISTER (43) OF TRANSMITTING CIRCUIT (21) | - | - | - | - | - | - | - | - | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | - | - | - | - | - | - | - | - | - | - | - | - | - | 6 | - | 0 | 1 | 2 | 3 | 4 | 5 | 6 | 7 | 8 | 9 | 10 |
| WP REGISTER (33) OF RECEIVING CIRCUIT (22-2) | - | - | - | - | - | - | - | - | - | - | 0 | - | 5 | 6 | 7 | 8 | 9 | 10 | 11 | 12 | 13 | 14 | 15 | - | - | - |
| WP REGISTER (33) OF RECEIVING CIRCUIT (22-3) | - | - | - | - | - | - | - | - | 0 | - | 2 | 3 | 4 | 5 | 6 | 7 | 8 | 9 | 10 | 11 | 12 | 13 | 14 | 15 | -8 | -7 |

| | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|---|---|---|---|---|---|---|
| CHIP(10-1) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | 0 | 1 | 2 | 3 | 4 | 5 | 6 | 7 | 8 | 9 | 10 | 11 | 12 | 13 | 14 | 15 | -8 | -7 | -6 | -5 | -4 |
| WP REGISTER (33) OF RECEIVING CIRCUIT (22-2) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-2) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | 0 | 1 | 2 | 3 | 4 | 5 | 6 | 7 | 8 | 9 | 10 | 11 | 12 | 13 | 14 | 15 | -8 | -7 | -6 | -5 | -4 |
| WP REGISTER (33) OF RECEIVING CIRCUIT (22-1) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-3) | | | | | | | | | | | | | | | | | | | | | | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 | -3 | -2 |
| WP REGISTER (33) OF RECEIVING CIRCUIT (22-1) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-2) | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-4) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 |
| WP REGISTER (33) OF RECEIVING CIRCUIT (22-2) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |

FIG. 7

| | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 |
|---|---|---|---|---|---|---|---|---|---|---|---|---|---|---|---|---|---|---|---|---|---|---|---|---|---|---|---|---|---|---|---|---|---|
| CHIP(10-1) | | | | | | | | | | | | | | | | | | | | | | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 2 | 3 | 4 | 15 | -8 | -7 | -6 | -5 | -4 |
| WP REGISTER (33) OF RECEIVING CIRCUIT (22-2) | 4 | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-2) | | | | | | | | | | | | | | | | | | | | | | | | | | | | | | | | | |
| SWP REGISTER (43) OF TRANSMITTING CIRCUIT (21) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-3) | | | | | | | | | | | | | | | | | | | | | | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 | -3 | -2 |
| WP REGISTER (33) OF RECEIVING CIRCUIT (22-1) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 |
| WP REGISTER (33) OF RECEIVING CIRCUIT (22-2) | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-4) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 |
| WP REGISTER (33) OF RECEIVING CIRCUIT (22-2) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |

| | 89 | 90 | 91 | 92 | 93 | 94 | 95 | 96 | 97 | 98 | 99 | 100 | 102 | 104 | 106 | 108 | 110 | 112 | 114 | 116 | 118 | 120 |
|---|---|---|---|---|---|---|---|---|---|---|---|---|---|---|---|---|---|---|---|---|---|---|
| CHIP(10-1) | | | | | | | | | | | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | -4 |
| WP REGISTER (33) OF RECEIVING CIRCUIT (22-2) | 4 | 5 | 6 | 7 | 8 | 9 | 10 | 11 | 12 | 13 | 14 | 15 | -8 | -7 | -6 | -5 | -4 | -3 | -2 | -1 | 0 | -5 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 12 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 13 |
| CHIP(10-2) | | | | | | | | | | | | | | | | | | | | | | |
| SWP REGISTER (43) OF TRANSMITTING CIRCUIT (21) | 11 | 12 | 13 | 14 | 15 | -8 | -7 | -6 | -5 | -4 | -3 | -2 | -1 | 0 | 1 | 2 | 3 | 4 | 5 | 6 | 7 | -4 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | -5 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 12 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 13 |
| CHIP(10-3) | | | | | | | | | | | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | 9 | 10 | -2 |
| WP REGISTER (33) OF RECEIVING CIRCUIT (22-1) | 10 | 11 | 12 | 13 | 14 | 15 | -8 | -7 | -6 | -5 | -4 | -3 | -2 | -1 | 0 | 1 | 2 | 3 | 4 | 5 | 6 | -6 |
| WP REGISTER (33) OF RECEIVING CIRCUIT (22-2) | 8 | 9 | 10 | 11 | 12 | 13 | 14 | 15 | -8 | -7 | -6 | -5 | -4 | -3 | -2 | -1 | 0 | 1 | 2 | 3 | 4 | -7 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 13 |
| CHIP(10-4) | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | -7 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | 13 |
| WP REGISTER (33) OF RECEIVING CIRCUIT (22-2) | 9 | 10 | 11 | 12 | 13 | 14 | 15 | -8 | -7 | -6 | -5 | -4 | -3 | -2 | -1 | 0 | 1 | 2 | 3 | 4 | 5 | -6 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | -7 |

| | 138 | 140 | 142 | 144 | 146 | 148 | 150 | 152 | 154 | 156 | 158 | 160 | 162 | 164 | 166 | 168 |
|---|---|---|---|---|---|---|---|---|---|---|---|---|---|---|---|---|
| CHIP(10-1) | | | | | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-2) | 5 | 6 | 7 | 8 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-2) | | | | | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-1) | 5 | 6 | 7 | 8 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-3) | | | | | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 | -3 |
| WP REGISTER (33) OF RECEIVING CIRCUIT (22-1) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-2) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-4) | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 |
| WP REGISTER (33) OF RECEIVING CIRCUIT (22-1) | 5 | 6 | 7 | 8 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-2) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 |

|  | 234 | 236 | 238 | 240 | 242 | 244 | 246 | 248 | 250 | 252 | 254 | 256 |
|---|---|---|---|---|---|---|---|---|---|---|---|---|
| CHIP(10-1) | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 |
| WP REGISTER (33) OF RECEIVING CIRCUIT (22-2) | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 |
| CHIP(10-2) | | | | | | | | | | | | |
| SWP REGISTER (43) OF TRANSMITTING CIRCUIT (21) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 |
| CHIP(10-3) | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 |
| WP REGISTER (33) OF RECEIVING CIRCUIT (22-1) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 |
| WP REGISTER (33) OF RECEIVING CIRCUIT (22-2) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 |
| WP REGISTER (33) OF RECEIVING CIRCUIT (22-4) | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 |
| CHIP(10-4) | | | | | | | | | | | | |
| SWP REGISTER (43) OF TRANSMITTING CIRCUIT (21) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 |
| WP REGISTER (33) OF RECEIVING CIRCUIT (22-1) | 5 | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 |
| WP REGISTER (33) OF RECEIVING CIRCUIT (22-2) | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 |

$$Z = \begin{pmatrix} 7 & 0 & 10 & 5 \\ 0 & 7 & 9 & 5 \\ 0 & -1 & 7 & 0 \\ 0 & 5 & 7 & 7 \end{pmatrix} \xrightarrow{\text{TIME ADJUSTING OPERATION}} Z = \begin{pmatrix} 7 & 0 & 7 & 3 \\ 0 & 7 & 6 & 3 \\ 3 & 2 & 7 & 1 \\ 2 & 7 & 6 & 7 \end{pmatrix} \quad V = \begin{pmatrix} -3 \\ -3 \\ 0 \\ -1 \end{pmatrix}$$

| | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 |
|---|---|---|---|---|---|---|---|---|---|---|---|---|---|---|---|---|---|---|---|---|---|---|---|---|---|---|---|---|---|---|---|---|---|
| CHIP(10-1) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-2) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | -1 | 0 | 1 | 2 | 3 | 4 | 5 | 6 | 7 | 8 |
| WP REGISTER (33) OF RECEIVING CIRCUIT (22-3) | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 | -4 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-2) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | -1 | 0 | 1 | 2 | 3 | 4 | 5 | 6 | 7 | 8 |
| WP REGISTER (33) OF RECEIVING CIRCUIT (22-3) | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 | -6 | -5 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-3) | | | | | | | | | | | | | | | | | | | | | | | | | | | | | | | | | |
| SWP REGISTER (43) OF TRANSMITTING CIRCUIT (21) | 14 | 15 | -8 | -7 | -6 | -5 | -4 | -3 | -2 | -1 | 0 | 1 | 2 | 3 | 4 | 5 | 6 | 7 | 8 | -1 | 0 | 1 | 2 | 3 | 4 | 5 | 6 | 7 | 8 | -5 | -4 | -3 | -2 |
| WP REGISTER (33) OF RECEIVING CIRCUIT (22-1) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-2) | 6 | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 |
| WP REGISTER (33) OF RECEIVING CIRCUIT (22-4) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| CHIP(10-4) | | | | | | | | | | | | | | | | | | | | | | | | | | | | | | | | | |
| SWP REGISTER (43) OF TRANSMITTING CIRCUIT (21) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |
| WP REGISTER (33) OF RECEIVING CIRCUIT (22-1) | 2 | 3 | 4 | 5 | 6 | 7 | 8 | -7 | -6 | -5 | -4 | -3 | -2 | -1 | 0 | 1 | 2 | 3 | 4 | 5 | 6 | 7 | 8 | -1 | 0 | 1 | 2 | 3 | 4 | 5 | 6 | 7 | 8 |
| WP REGISTER (33) OF RECEIVING CIRCUIT (22-2) | 7 | 8 | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 |
| WP REGISTER (33) OF RECEIVING CIRCUIT (22-3) | 9 | 10 | 11 | 12 | 13 | 14 | 15 | -8 | -7 | -6 | -5 | -4 | -3 | -2 | -1 | 0 | 1 | 2 | 3 | 4 | 5 | 6 | 7 | 8 | 9 | 10 | 11 | 12 | 13 | 14 | 15 | -8 | -7 |

FIG. 16

SYSTEM CONTROL METHOD, CONTROL PROCESSING SYSTEM, AND CONTROL PROCESSING APPARATUS

BACKGROUND OF THE INVENTION

The present invention relates to a system control method, control processing system, and control processing apparatus and, more particularly, to a system control method for a control processing system which has a plurality of control processing apparatuses mutually connected via a connection network and performs control in cooperation with the respective control processing apparatuses by causing the respective control processing apparatuses to issue transactions containing various instructions as needed, a control processing system, and a control processing apparatus.

In various information processing apparatuses, when various kinds of processing are to be performed by control processing apparatuses such as CPUs (to be referred to as chips hereinafter), desired processes are distributed and executed in a plurality of chips, thereby realizing a multiprocessor system which improves processing performance.

In such a control processing system, the respective chips share hardware resources such as a memory and other peripheral circuits. Each chip incorporates a cache (cache memory) for temporarily holding data read out from the memory or data to be written in the memory in order to make efficient access to the memory. The consistency of data must therefore be maintained among the caches held by the respective chips and the memory.

The snoop scheme has been widely used as processing for maintaining such consistency. In this scheme, in order to maintain the consistency of data in the respective chips and the memory, the respective chips output instructions called snoop transactions.

In this case, the snoop transactions issued by the respective chips must be ordered, and the order must be shared among the respective chips. If the respective chips individually maintain the consistency of data without sharing the order of snoop transactions, old data may be overwritten on new data, resulting in data destruction.

FIG. 19 shows an example of a multiprocessor system based on the snoop scheme. In this multiprocessor system, a plurality of chips 100-1 to 100-n are coupled to each other via a bus 101. Clock signals are distributed from one clock generating circuit 102 to the respective chips 100-1 to 100-n. In this scheme, the snoop transactions issued by the respective chips are ordered by the single bus, and hence it is easy for all the chips to share the order.

In such a conventional control processing system, however, since a single bus is used as a connection network through which the respective chips exchange transactions, if a failure occurs in the bus, all the chips are affected by the failure. In addition, since clock signals are distributed from the same clock generating circuit to the respective chips, if a failure occurs in the clock generating circuit, all the chips are affected by the failure.

SUMMARY OF THE INVENTION

The present invention has been made to solve the above problems, and has as its object to provide a system control method, control processing system, and control processing apparatus which can process, in all control processing apparatuses, transactions exchanged among the respective control processing apparatuses in the same order without using a single bus or single clock generating circuit.

In order to achieve the above object, according to the present invention, there is provided a system control method used in a control processing system which has a plurality of control processing apparatuses mutually connected via a connection network and performs control in cooperation with the respective control processing apparatuses by causing the respective control processing apparatuses to issue transactions containing various instructions as needed, the method being adapted to process the transactions in the respective control processing apparatuses in the same order, and the method comprising steps of transmitting a transaction from the control processing apparatus to remaining control processing apparatuses via the connection network, and holding the transaction in a home reception buffer through a transmitting circuit, receiving transactions transmitted from the corresponding control processing apparatuses via the connection network, and holding the transactions in reception buffers through receiving circuits provided in correspondence with the respective remaining control processing apparatuses, and ordering transactions read out from the home reception buffer and the respective reception buffers and outputting the transactions through an arbitrating circuit, and exchanging predetermined transactions among the respective control processing apparatuses, and determining specific entries in which received transactions should be written and specific entries from which transactions should be output to the arbitrating circuit through the transmitting circuit and the receiving circuits, thereby setting identical combinations of transactions which the arbitrating circuit is to read out from the home reception buffer and the plurality of reception buffers in all the control processing apparatuses.

According to the present invention, there is also provided a control processing system which has a plurality of control processing apparatuses mutually connected via a connection network and performs control in cooperation with the respective control processing apparatuses by causing the respective control processing apparatuses to issue transactions containing various instructions as needed, wherein each of the control processing apparatuses comprises a transmitting circuit which transmits a transaction from the control processing apparatus to remaining control processing apparatuses via the connection network, and holds the transaction in a home reception buffer, receiving circuits which are provided in correspondence with the respective remaining control processing apparatuses, receive transactions transmitted from the corresponding control processing apparatuses via the connection network, and hold the transactions in reception buffers, and an arbitrating circuit which orders transactions read out from the home reception buffer and the respective reception buffers and outputs the transactions, and predetermined transactions are exchanged among the respective control processing apparatuses, and the transmitting circuit and the receiving circuits determine specific entries in which received transactions should be written and specific entries from which transactions should be output to the arbitrating circuit, thereby setting identical combinations of transactions which the arbitrating circuit is to read out from the home reception buffer and the plurality of reception buffers in all the control processing apparatuses.

BRIEF DESCRIPTION OF THE DRAWINGS

FIG. 3 is a view for explaining transmission delays among chips;

FIG. 4 is a view for explaining an example of the operation of the WP registers and SWP registers of the respective chips in the first embodiment;

FIG. 5 is a view for explaining an example of the operation of the WP registers and SWP registers of the respective chips in the second embodiment;

FIG. 6 is a view for explaining the example (continued) of the operation of the WP registers and SWP registers of the respective chips in the second embodiment;

Figure 7:
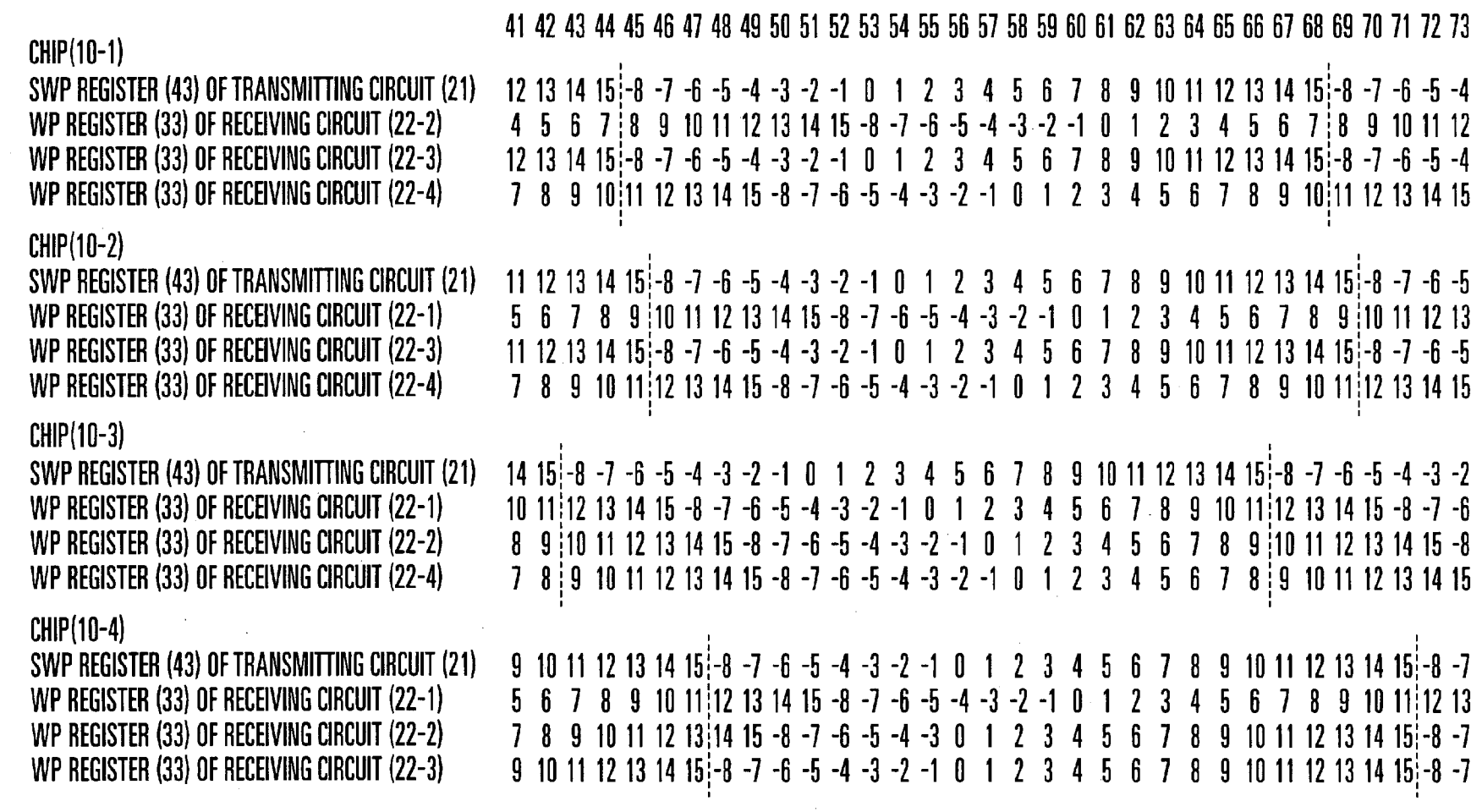

FIG. 7 is a view for explaining the example (continued) of the operation of the WP registers and SWP registers of the respective chips in the second embodiment;

FIG. 8 is a view for explaining the example (continued) of the operation of the WP registers and SWP registers of the respective chips in the second embodiment;

FIG. 9 is a view for explaining the example (continued) of the operation of the WP registers and SWP registers of the respective chips in the second embodiment;

FIG. 10 is a view for explaining the example (continued) of the operation of the WP registers and SWP registers of the respective chips in the second embodiment;

FIG. 11 is a view for explaining the example (continued) of the operation of the WP registers and SWP registers of the respective chips in the second embodiment;

FIG. 14 is a view for explaining time adjusting operation performed by a time control unit and arithmetic circuit;

FIG. 15 is a view for explaining an example of the operation of the WP registers and SWP registers of the respective chips in the third embodiment;

FIG. 16 is a view for explaining the example (continued) of the operation of the WP registers and SWP registers of the respective chips in the third embodiment;

DESCRIPTION OF THE PREFERRED EMBODIMENTS

Embodiments of the present invention will be described next with reference to the accompanying drawings.

[First Embodiment]

Figure 1:
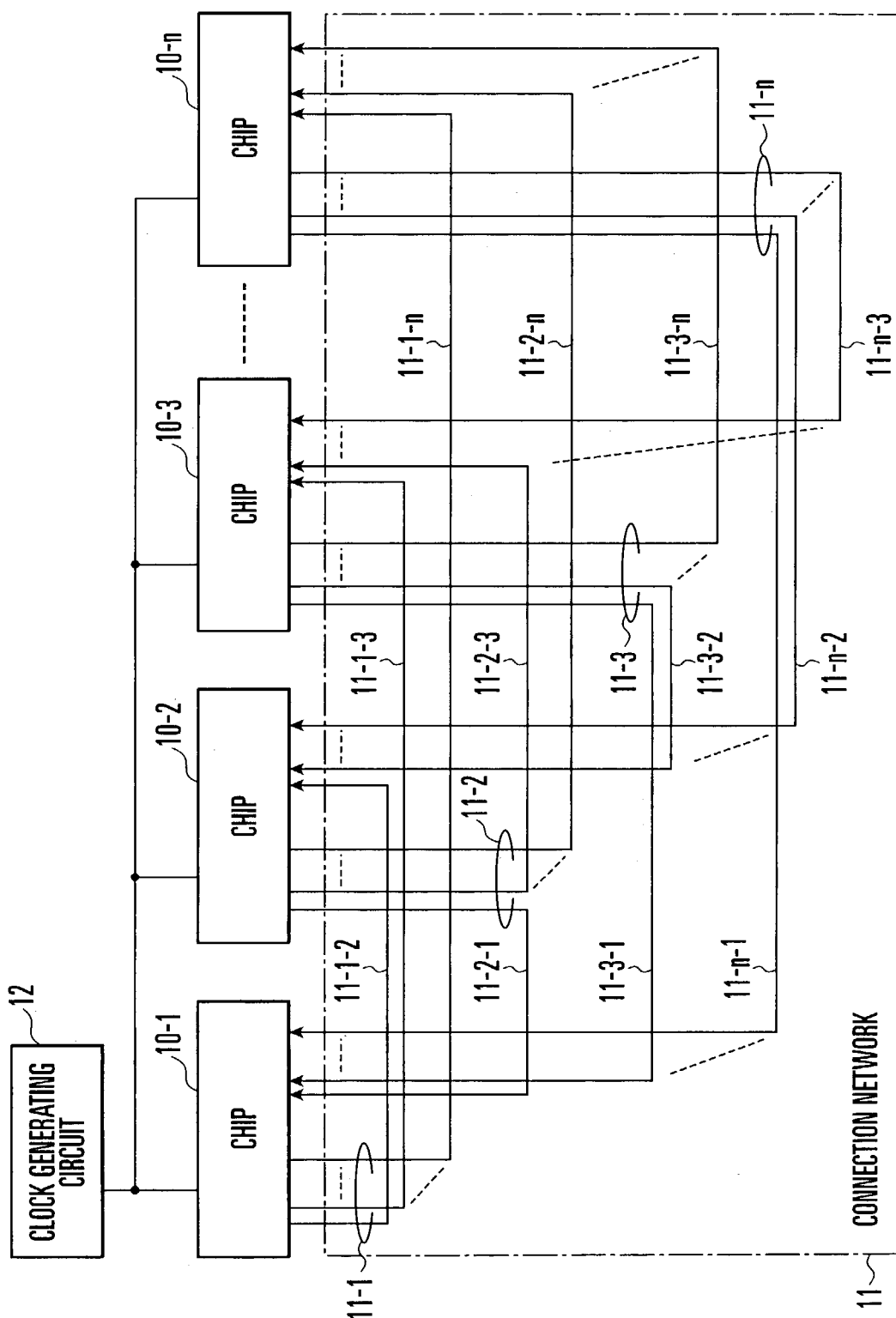
FIG. 1 is a block diagram showing the arrangement of a control processing system according to the first embodiment of the present invention.

A control processing system according to the first embodiment of the present invention will be described first with reference to FIG. 1. FIG. 1 shows the arrangement of the control processing system.

This system is comprised of a plurality of control processing apparatuses (to be referred to as chips hereinafter) 10-1 to 10-n (n is an integer equal to or more than two) and a connection network 11 which unidirectionally connects the respective chips 10 in the form of a matrix in a one-to-one correspondence.

The connection network 11 transmits a transaction (to be referred to as a Tx hereinafter) directly from one chip 10 to other chips 10 via different links. To give an example of the chip 10-k (k is an integer between 1 to n), it has a link group 11-k constituted by links 11-k-1 to 11-k-n (excluding 11-k-k) with respect to remaining chips 10-1 to 10-n (excluding 10-k). Transmission delays of the links can vary depending on their line length, and be different from each other. The maximum and minimum values of the transmission delays are only known in the system design stage.

This embodiment will exemplify the case wherein clocks output from a clock generating circuit 12 are input to the respective chips 10-1 to 10-n.

Figure 2:
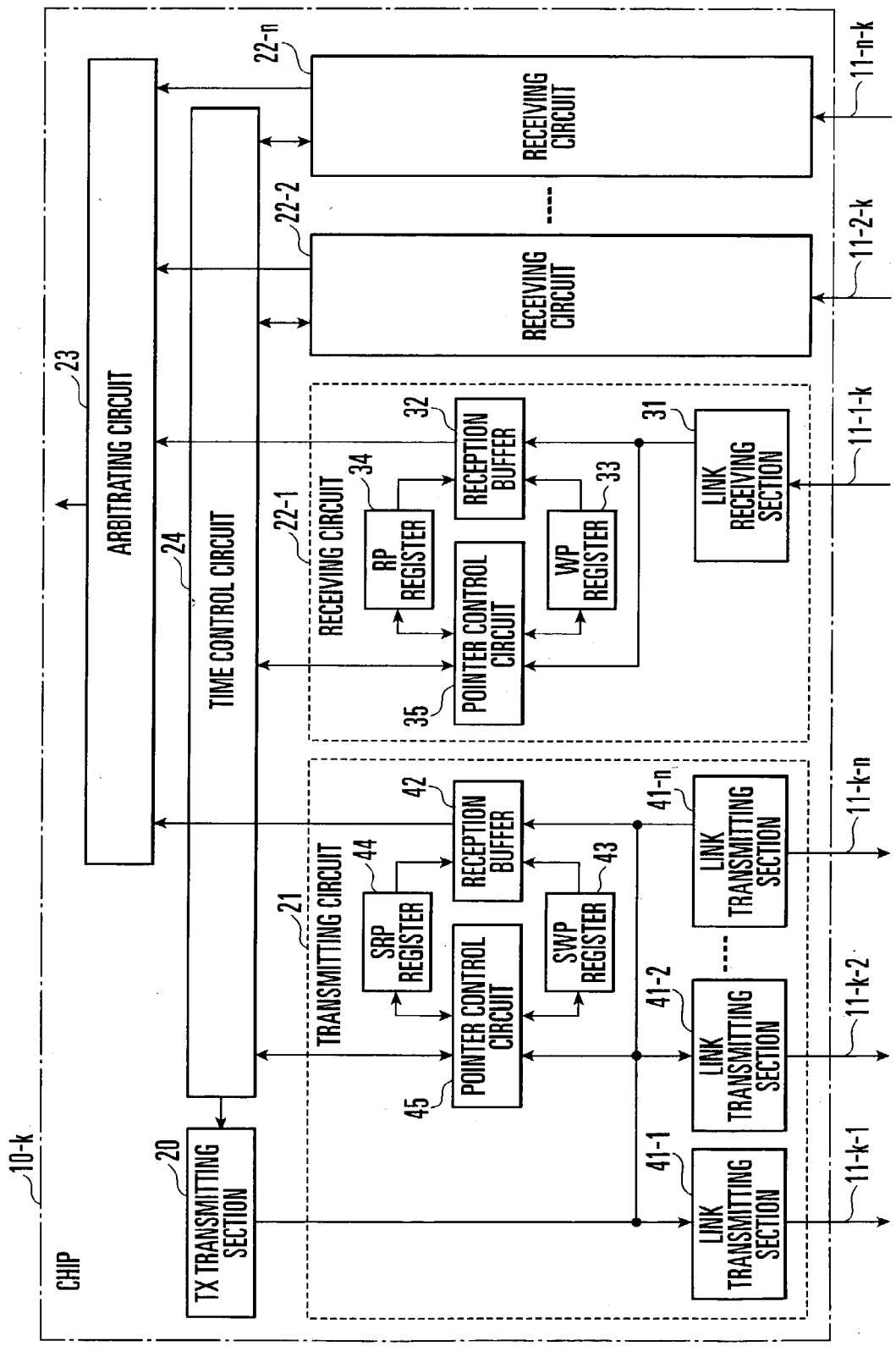
FIG. 2 is a block diagram showing an example of the arrangement of a chip used in the first embodiment.

FIG. 2 shows the arrangement of each chip 10-k. Each chip 10-k includes a Tx transmitting section 20, transmitting circuit 21, (n−1) receiving circuits 22-1 to 22-n (excluding 22-k), arbitrating circuit 23, and time control circuit 24.

The Tx transmitting section 20 is a circuit section for outputting Txs to the transmitting circuit 21.

The transmitting circuit 21 includes (n−1) link transmitting sections 41-1 to 41-n (excluding 41-k), a reception buffer (home reception buffer) 42, an SWP register 43, an SRP register 44, and a pointer control circuit 45.

The link transmitting sections 41-1 to 41-n (excluding 41-k) are circuit sections for receiving Txs output from the Tx transmitting section 20, converting them into predetermined signals, and outputting the signals to the respective links 11-k-1 to 11-k-n (excluding 11-k-k). The signals output to the respective links 11-k-1 to 11-k-n are distributed to the receiving circuits 22-k of the remaining chips 10-1 to 10-n (excluding 10-k).

The SWP register 43 and SRP register 44 are ring counters which count up for every clock.

The reception buffer 42 is a circuit section for storing the Tx output from the Tx transmitting section 20 in the entry indicated by the SWP register 43 and outputting the Tx from the entry indicated by the SRP register 44 to the arbitrating circuit 23.

The pointer control circuit 45 is a circuit section for setting a value in the SRP register 44 or SWP register 43 in accordance with a specific Tx output from the Tx transmitting section 20 and an instruction from the time control circuit 24.

To give an example of the receiving circuits 22-1, it includes a link receiving section 31, reception buffer 32, WP register 33, RP register 34, and pointer control circuit 35.

Signals from the link 11-k-1 are received by the link receiving sections 31. The link receiving sections 31 converts the received signals into Txs and outputs them to the reception buffer 32 and pointer control circuit 35.

The WP register 33 and RP register 34 are ring counters which count up for every clock.

The reception buffer 32 is a circuit section for storing the Tx output from the link receiving section 31 in the entry indicated by the WP register 33 and outputting the Tx from the entry indicated by the RP register 34.

The pointer control circuit 35 is a circuit section for setting a value in the RP register 34 or the WP register 33 upon reception of a specific Tx from the link receiving section 31 and an instruction from the time control circuit 24. In addition, in accordance with the specific Tx output from the link receiving section 31, this circuit section notifies the time control circuit 24 of the corresponding information.

The time control circuit 24 is a circuit section for performing synchronization processing.

The arbitrating circuit 23 is a circuit section for arbitrating Txs output from the reception buffers 32 and 42, sorting the Txs, and outputting them.

Let $T_{max}$ and $T_{min}$ be the maximum and minimum numbers of clocks required in the interval between the instant at which the Tx transmitting section 20 of the chip 10-k outputs a Tx to the transmitting circuit 21 and the instant at which the link receiving section 31 of another chip 10-i (i is an integer between 1 to n, excluding k) receives the Tx and outputs it.

Using $T_{max}$ and $T_{min}$, the depth of the reception buffer 32 and 42 and the size of the SWP register 43, SRP register 44, WP registers 33 and RP registers 34 are determined as follows. The depth of the reception buffer 42 is "$T_{max} \times 2 - T_{min} + 1$", and the depth of the reception buffer 32 is "$(T_{max} - T_{min}) \times 3 + 1$". The SWP register 43 and SRP register 44 repeatedly count from "0" to "$T_{max} \times 2 - T_{min}$". The WP registers 33 and RP registers 34 repeatedly count from "0" to "$(T_{max} - T_{min}) \times 3$".

The operation of the control processing system according to this embodiment will be described next.

Of the following operation, the portion performed by the time control circuit 24 is implemented by synchronization processing by the time control circuit 24. The synchronization start Tx and synchronization Tx are used in the following operation.

[Phase 1]

On the chip 10-1, when synchronization of the respective reception buffers is to be done, the time control circuit 24 instructs the Tx transmitting section 20 to send out a synchronization start Tx. Upon reception of this instruction, the Tx transmitting section 20 sends out the synchronization start Tx. This Tx sent out from the Tx transmitting section 20 is transferred to the link transmitting sections 41-2 to 41-n and output to remaining chips 10-2 to 10-n via the link group 11-1 of the connection network 11.

On each of the chips 10-2 to 10-n, the link receiving section 31 of the receiving circuit 22-1 receives this synchronization start Tx. The link receiving sections 31 outputs this Tx to the pointer control circuit 35 and the reception buffer 32. Upon reception of this Tx, the pointer control circuit 35 notifies the time control circuit 24 of the reception of this Tx.

[Phase 2]

On the chip 10-1, "$T_{max}+1$" clocks after the sending of the synchronization start Tx, the time control circuit 24 instructs the Tx transmitting section 20 to send out a synchronization Tx.

On each of the chips 10-2 to 10-n, the time control circuit 24 receives the notification of the reception of the synchronization start Tx from the pointer control circuit 35, and instructs the Tx transmitting section 20 to send out a synchronization Tx.

On each of the chips 10-1 to 10-n, upon reception of the synchronization Tx from the Tx transmitting section 20, the pointer control circuit 45 sets the SWP register 43 "0". And the link transmitting section 41 transmits this Tx from the Tx transmitting section 20 to the remaining chips 10.

These synchronization Txs are sent to all the link receiving sections 31 of all the chips 10-1 to 10-n via the connection network 11.

On each of the chips 10-1 to 10-n, each link receiving section 31 outputs the received synchronization Tx to the pointer control circuit 35 and reception buffer 32. Upon reception of the synchronization Tx, the pointer control circuit 35 sets the WP register 33 to "0".

[Phase 3]

On each of the chips 10-1 to 10-n, the time control circuit 24 sets the RP register 34 and SRP register 44 to "0" at the time point the SWP register 43 becomes "0" again, i.e., "$T_{max} \times 2 + 1 - T_{min}$" clocks after the instruction to transmit the synchronization Tx is output on phase 2.

In phases 1 to 3 described above, synchronization processing among the respective chips 10-1 to 10-n is completed. With these processing, in all the chips 10-1 to 10-n, the synchronization Txs are written in the 0th entries of the reception buffers 32 and 42 and are output to the arbitrating circuits 23 when the RP registers 34 and SRP registers 44 are set to "0". In the reception buffers 32 and 42, the Txs issued by the corresponding chips 10-1 to 10-n are written for every cycle. More specifically, the Tx issued in the next cycle to the synchronization Tx is written in the 1st entry, and the Tx issued two cycles after the synchronization Tx is written in the 2nd entry. In the reception buffers 32 and 42 of the respective chips 10-1 to 10-n, no transactions are overwritten on the next transactions before they are read out, or no transactions are read out before any transactions are written.

The arbitrating circuits 23 of all the chips 10-1 to 10-n read out transactions from all the reception buffers 32 and 42 of the respective chips 10-1 to 10-n and order them in the same manner, and all the chips 10-1 to 10-n can share the same order relationship of Txs from all the chips 10-1 to 10-n.

Figure 4:
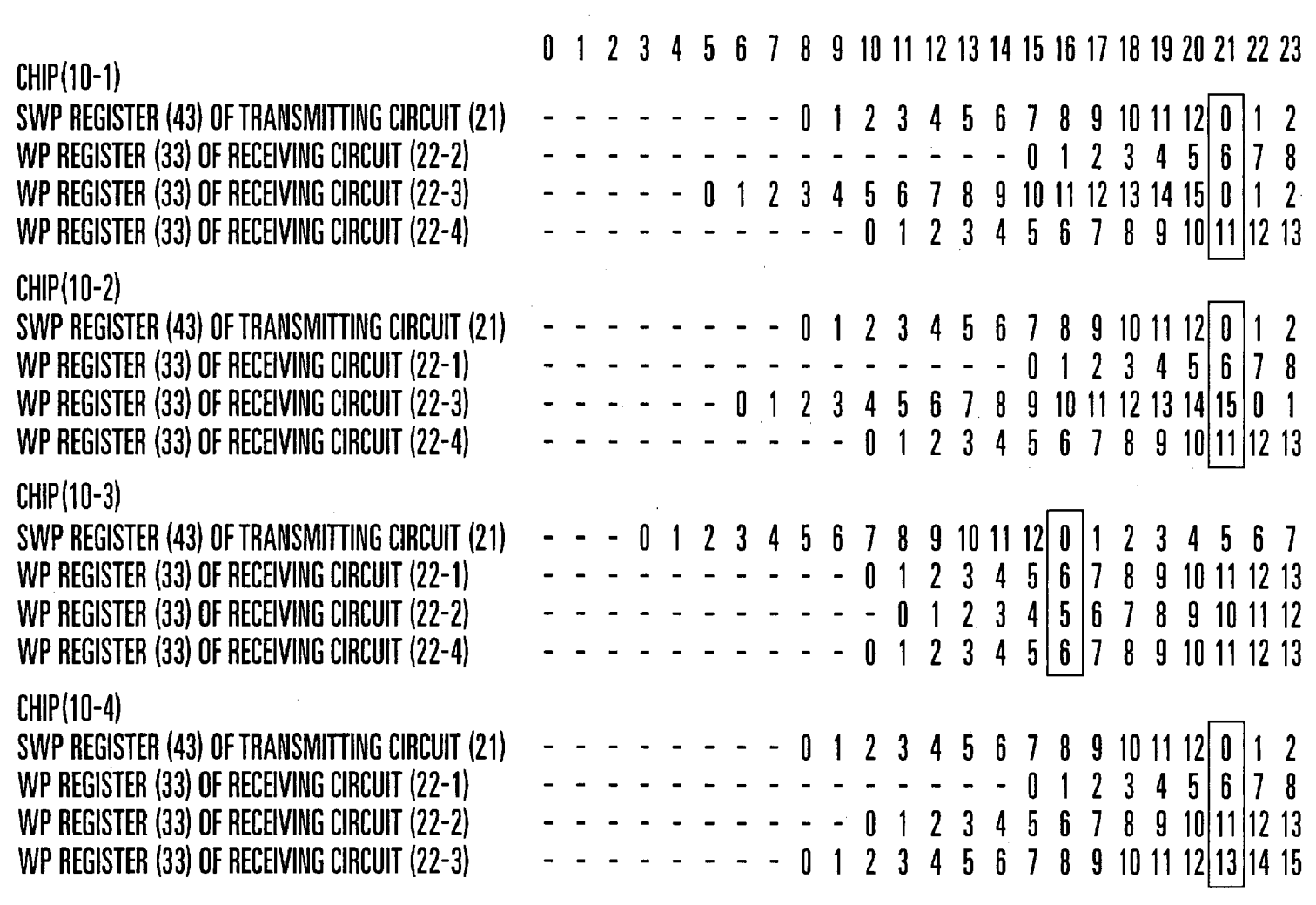

An example of the operation of this embodiment will be described next with reference to FIGS. 3 and 4. FIG. 3 explains transmission delay amounts (unit: clock) on the respective links that connect the respective chips 10-1 to 10-n. FIG. 4 explains the transition of the values of the SWP registers 43 and WP registers 33 of the respective chips 10-1 to 10-n.

Assume that in this case, the control processing system is comprised of the four chips 10-1 to 10-4. Assume also that $T_{max}=7$ and $T_{min}=2$. At this time, the depth of the reception buffer 42 becomes "13", and the depth of the reception buffer 32 becomes "16". The SWP register 43 and SRP register 44 count from "0" to "12" for every clock, and the WP register 33 and RP register 34 count from "0" to "15".

First of all, processing in phase 1 is started.

At time "0", the time control circuit 24 of the chip 10-1 instructs the Tx transmitting section 20 to transmit a synchronization start Tx. The synchronization start Tx is distributed to the remaining chips 10-2 to 10-4 via the connection network 11.

Upon reception of the synchronization start Txs, the link receiving sections 31 of the receiving circuits 22-1 of the respective chips 10-2 to 10-4 output the synchronization start Txs to the pointer control circuits 35 at time "7" in the chip 10-2, at time "2" in the chip 10-3, and at time "7" in the chip 10-4.

Upon reception of the synchronization start Txs, the pointer control circuits 35 notify the time control circuits 24 of the reception. The pointer control circuits 35 also set the values of the WP registers 33 to "0" at time "8" in the chip 10-2, at time "3" in the chip 10-3, and at time "8" in the chip 10-4.

The flow of processing then shifts to phase 2.

The time control circuits 24 of the respective chips 10-2 to 10-n receive the notifications of the reception of the synchronization start Txs, and instruct the Tx transmitting sections 20 to transmit synchronization Txs at time "8" in the chip 10-2, at time "3" in the chip 10-3, and at time "8" in the chip 10-4.

At time "8" after the lapse of "8" clocks since the transmission of the synchronization start Tx, the time control circuit 24 of the chip 10-1 instructs the Tx transmitting section 20 to transmit the synchronization Tx.

Upon the instruction to transmit the synchronization Tx, each Tx transmitting section 20 transmits the synchronization Tx. Upon reception of the Txs, the pointer control circuits 45 set the values of the SWP registers 43 to "0" at time "8" in the chip 10-1, at time "3" in the chip 10-3, and at time "8" in the chip 10-4.

The synchronization Txs transmitted from the respective chips 10-1 to 10-4 reach the link receiving sections 31 of the receiving circuits 22-1 to 22-4 of the chips 10-1 to 10-4.

Upon reception of the synchronization Txs, the link receiving sections 31 output them to the pointer control circuits 35 and reception buffers 32. And the pointer control circuits 35 of the respective chips 10-1 to 10-n, which have received the synchronization Txs, set the values of the WP registers 33 to "0" at time "15" in the receiving circuit 22-2 of the chip 10-1, at time "5" in the receiving circuit 22-3 of the chip 10-1, at time "10" in the receiving circuit 22-4 in the chip 10-1, at time "15" in the receiving circuit 22-1 of the chip 10-2, at time "6" in the receiving circuit 22-3 of the chip 10-2, at time "10" in the receiving circuit 22-4 in the chip 10-2, at time "10" in the receiving circuit 22-1 of the chip 10-3, at time "11" in the receiving circuit 22-2 of the chip 10-3, at time "10" in the receiving circuit 22-3 in the chip 10-3, at time "15" in the receiving circuit 22-1 of the chip 10-4, at time "10" in the receiving circuit 22-2 of the 10-4, and at time "8" in the receiving circuit 22-3 in the chip 10-4.

The flow of processing then shifts to phase 3.

The time control circuits 24 of the respective chips 10-1 to 10-4 set the RP registers 34 and SRP registers 44 to "0" "13 $(=T_{max} \times 2+1-T_{min})$" clocks after the sending of the instructions to transmit the synchronization Txs. With this operation, the RP registers 34 and SRP registers 44 are set to "0" at time "21" in the chip 10-1, at time "21" in the chip 10-2, at time "16" in the chip 10-3, and at time "21" in the chip 10-4.

The synchronization processing is completed when the RP registers 34 and SRP registers 44 in the respective chips 10-1 to 10-4 are set to "0".

With the above processing, in all the chips 10-1 to 10-4, the synchronization Txs are written in the 0th entries in the reception buffers 32 and 42, and are output to the arbitrating circuits 23 when the RP registers 34 and SRP registers 44 are set to "0". In the reception buffers 32 and 42, the Txs issued by the corresponding chips 10-1 to 10-4 are written for every cycle. More specifically, the Tx issued in the next cycle to the synchronization Tx is written in the 1st entry, and the Tx issued two cycles after the synchronization Tx is written in the 2nd entry. In the reception buffers 32 and 42 of the respective chips 10-1 to 10-4, no transactions are overwritten on the next transactions before they are read out, or no transactions are read out before any transactions are written.

The arbitrating circuits 23 of all the chips 10-1 to 10-4 read out transactions from all the reception buffers 32 and 42 of the respective chips 10-1 to 10-4 and order them in the same manner, and all the chips 10-1 to 10-4 can share the same order relationship of Txs from all the chips 10-1 to 10-4.

As is obvious, therefore, according to this embodiment, the read and write timings of transactions in the home reception buffers and the respective reception buffers are controlled by exchanging predetermined transactions among the respective chips and setting write and read entries in the transmitting and receiving circuits in accordance with the transmission delays between the home control processing apparatus and the remaining control processing apparatuses via the connection network. This makes it possible to process the transactions exchanged among the respective chips in the same order in all the chips without using a single bus.

[Second Embodiment]

A control processing system according to the second embodiment of the present invention will be described next.

The control processing system according to this embodiment has almost the same arrangement as that of the first embodiment (see FIGS. 1 and 2) described above except for the sizes of reception buffers 32 and 42, WP registers 33, SWP registers 43, PR register 34, and SRP registers 44 and synchronization processing performed by time control circuits 24.

In this embodiment, the depth of each of the reception buffers 32 and 42 is "$T_{max}+1$". The WP registers 33 and SWP registers 43 count from "$-(T_{max}+1)$" to "$2 \times T_{max}+1$". The RP registers 34 and SRP registers 44 count from "0" to "$T_{max}$". In writing data in each of the reception buffers 32 and 42, the data is written in the entry indicated by the remainder obtained by dividing the value of a corresponding one of the WP registers 33 and SWP registers 43 by "$T_{max}+1$".

The operation of the control processing system according to this embodiment will be described next.

Synchronization processing by the time control circuit 24 implements part of the following operation which is performed by the time control circuit 24. The synchronization start Tx, synchronization Tx, and time adjustment Tx are used in the following operation.

[Phase 1]

On the chip 10-1, when synchronization of the respective reception buffers is to be done, the time control circuit 24 instructs the Tx transmitting section 20 to send out a synchronization start Tx. Upon reception of this instruction, the Tx transmitting section 20 sends out the synchronization start Tx. This Tx sent out from the Tx transmitting section 20 is transferred to the link transmitting sections 41-2 to 41-n and output to remaining chips 10-2 to 1-n via the link group 11-1 of the connection network 11.

On each of the chips 10-2 to 10-n, the link receiving section 31 of the receiving circuit 22-1 receives this synchronization start Tx. The link receiving sections 31 outputs this Tx to the pointer control circuit 35 and the reception buffer 32. Upon reception of this Tx, the pointer control circuit 35 notifies the time control circuit 24 of the reception of this Tx.

[Phase 2]

On the chip 10-1, "$T_{max}+1$" clocks after the sending of the synchronization start Tx, the time control circuit 24 instructs the Tx transmitting section 20 to send out a synchronization Tx.

On each of the chips 10-2 to 10-n, the time control circuit 24 receives the notification of the reception of the synchronization start Tx from the pointer control circuit 35, and instructs the Tx transmitting section 20 to send out a synchronization Tx.

On each of the chips 10-1 to 10-n, upon reception of the synchronization Tx from the Tx transmitting section 20, the pointer control circuit 45 sets the SWP register 43 to "0". And the link transmitting section 41 transmits this Tx from the Tx transmitting section 20 to the remaining chips 10.

These synchronization Txs are sent to all the link receiving sections 31 of all the chips 10-1 to 10-n via the connection network 11.

On each of the chips 10-1 to 10-n, each link receiving section 31 outputs the received synchronization Tx to the pointer control circuit 35 and reception buffer 32. Upon reception of the synchronization Tx, the pointer control circuit 35 sets the WP register 33 to "0".

[Phase 3]

On each of the chips 10-1 to 10-n, when the value of the SWP register 43 becomes "$2 \times T_{max}+1$", the time control circuit 24 checks whether any of the WP registers 33 indicate negative values.

If some WP registers 33 indicate negative values, the time control circuit 24 instructs the Tx transmitting section 20 to transmit a synchronization Tx when the value of the WP register 33 of the WP registers 33 which indicates the minimum value becomes "0". Upon reception of the synchronization Tx sent out from the Tx transmitting section 20, the pointer control circuit 45 sets the value of the SWP register 43 to "0". At the same time, the link transmitting sections 41-1 to 41-n transmit the synchronization Txs to the remaining chips 10-1 to 10-n.

If no WP register 33 indicates a negative value, the time control circuit 24 does nothing.

On each of the chips 10-1 to 10-n, receiving the synchronization Tx, the link receiving section 31 outputs the synchronization Tx to the pointer control circuits 35. Upon reception of the synchronization Txs, the pointer control circuits 35 set the values of the WP registers 33 to "0", and notify the time control circuits 24 of the reception of the synchronization Txs.

On each of the chips 10-1 to 10-n, if the pointer control circuit 35 has made an instruction to transmit a synchronization Tx or received some notifications of the reception of the synchronization Tx from the receiving circuits 22-1 to 22-n by the time the value of the SWP register 43 changes from "$-(T_{amx}+1)$" to "$2 \times T_{max}+1$", the time control circuit 24 repeats phase 3. Otherwise, the time control circuit 24 performs processing in phase 4.

[Phase 4]

On each of the chips 10-1 to 10-n, when the value of the SWP register 43 becomes "$2 \times T_{max}+1$", the time control circuit 24 checks whether any of the WP registers 33 indicate values between "0" and "$T_{max}$".

If some WP register 33 indicate such a value, the time control circuit 24 instructs the Tx transmitting section 20 to transmit at time adjustment Tx when the value of the SWP register 43 becomes the value obtained by subtracting "$T_{max}+1$" from the value of the WP register 33. If a plurality of WP registers 33 indicate values between "0" and "$T_{max}$", a plurality of time adjustment Txs are issued. These time adjustment Txs additionally have information that these Txs target the chips 10. For example, if the WP register 33 of the receiving circuits 22-i matches above condition, the corresponding time adjustment Tx has information that this Tx targets the chip 10-i.

If the pointer control circuit 35 receives the time adjustment Tx which targets this chip 10, it notifies the time control circuit 24 of the reception of the time adjustment Tx together with the current value of the WP register 33. If the time adjustment Tx does not target this chip 10, the pointer control circuit 35 notifies the time control circuit 24 of the reception of the time adjustment Txs together with the value "0". And upon reception of the notification of the reception of the time adjustment Txs, the time control circuit 24 stores one of the time adjustment Txs which has the minimum value.

If the pointer control circuit 35 has made an instruction to transmit some time adjustment Txs or received some notifications of the reception of the time adjustment Tx by the time the value of the SWP register 43 changes from "$-(T_{max}+1)$" to "$2 \times T_{max}+1$", the time control circuit 24 shifts to phase 5. Otherwise, when the value of the SWP register 43 becomes "$2 \times T_{max}+1$", the time control circuit 24 checks whether any of the WP registers 33 indicates a negative value. Some of the chips 10-1 to 10-n in which such WP registers exist shift to the processing in phase 3, whereas the remaining chips shift to phase 6.

[Phase 5]

On each of the chips 10-1 to 10-n, when the value of the SWP register 43 becomes the value stored in phase 4, the time control circuit 24 instructs the Tx transmitting section 20 to transmit a synchronization Tx. If, however, the stored value is "0", the time control circuit 24 issues no instruction to transmit a synchronization Tx.

Upon reception of the synchronization Tx sent out from the Tx transmitting section 20, the pointer control circuit 45 sets the value of the SWP register 43 to "0". At the same time, the link transmitting sections 41-1 to 41-n transmit the synchronization Txs to the remaining chips 10-1 to 10-n.

On each of the chips 10-1 to 10-n, receiving the synchronization Tx, the link receiving section 31 outputs the synchronization Tx to the pointer control circuit 35. Upon reception of the synchronization Tx, the pointer control circuit 35 sets the value of the WP register 33 to "0" and notifies the time control circuit 24 of the reception of the synchronization Tx.

When the value of the SWP register 43 becomes "$2 \times T_{max}+1$", the time control circuit 24 shifts to phase 4.

[Phase 6]

On each of the chips 10-1 to 10-n, upon receiving the synchronization Tx by the time the value of the SWP register 43 changes from "$-(T_{max}+1)$" to "$2 \times T_{max}+1$", the pointer control circuit 35 sets the value of the WP register 33 to "0" and notifies the time control circuit 24 of the reception of the synchronization Tx.

If the time control circuit 24 has received the notification of the reception of the synchronization Tx by the time the value of the SWP register 43 changes from "$-(T_{max}+1)$" to "$2 \times T_{max}+1$", it shifts to the processing in phase 3. Otherwise, it shifts to processing in phase 7.

[Phase 7]

On each of the chips 10-1 to 10-n, when the value of the SWP register 43 becomes "$T_{max}+1$", the time control circuit 24 sets the values of the RP register 34 and SRP register 44 to "0", thus completing the synchronization processing.

With the above processing, when the value of the SWP register 43 becomes "$T_{max}+1$", the value of the WP register 33 can take a value between "$T_{min}-T_{max}+1$" and "$2 \times (T_{max}-T_{min})+1$" in phase 2 (a negative value indicates that the WP register 33 has not actually been set at this time point but will be set when the value becomes "0"), and will take a value between "1" and "$T_{max}+1$" when synchronization is completed by making adjustments in the subsequent phases.

The Tx output from each chip 10-k is written when the value of the SWP register 43 of the chip 10-k coincides with the value of the WP register 33 of the receiving circuit 22-k of each of the remaining chips 10-1 to 10-n. That is, the Tx written in the 0th entry in the reception buffer 42 of the chip 10-k is written in the 0th entry in the reception buffer 32 of the receiving circuit 22-k of each of the remaining chips 10-1 to 10-n. Since this applies to all the chips 10-1 to 10-n, if the arbitrating circuits 23 of all the chips 10-1 to 10-n read out transactions from all the reception buffers 32 and 42 of the respective chips 10-1 to 10-n for every cycle and order them in the same manner, all the chips 10-1 to 10-n can share the same order relationship of Txs from all the chips 10-1 to 10-n.

An example of the operation of this embodiment will be described next with reference to FIGS. 3 and 5 to 11. FIGS. 5 to 11 explain the transition of the values of the WP registers 33 and SWP registers 43 of the respective chips 10-1 to 10-4.

The control processing system according to this embodiment is comprised of the four chips 10-1 to 10-4. Assume that $T_{max}=7$ and $T_{min}=2$. The depth of the reception buffers 32 and 42 is "8". The WP registers 33 and SWP registers 43 count from "−8" to "15". The RP registers 34 and SRP registers 44 count from "0" to "7".

At time "0", the Tx transmitting section 20 of the chip 10-1 transmits a synchronization start Tx. The link receiving sections 31 of the receiving circuits 22-1 of the respective chips 10-2 to 10-4 output the Txs to the pointer control circuits 35 at time "7" in the chip 10-2, at time "2" in the chip 10-3, and at time "7" in the chip 10-4.

Upon reception of the Txs, the pointer control circuits 35 notify the time control circuits 24 of the reception. In addition, the pointer control circuits 35 set the values of the WP register 33 to "0" at time "8" in the chip 10-2, at time "3" in the chip 10-3, and at time "8" in the chip 10-4. Operation in phase 1 is done in the above manner.

Upon reception of the notifications of the reception of the synchronization start Txs, the time control circuits 24 instruct the Tx transmitting sections 20 to transmit synchronization Txs, at time "8" in the chip 10-2, at time "3" in the chip 10-3, and at time "8" in the chip 10-4.

At time "8" after the lapse of "8" clocks since the transmission of the synchronization start Tx, the time control circuit 24 of the chip 10-1 instructs the Tx transmitting section 20 to transmit a synchronization Tx.

Upon reception of the instruction to transmit the synchronization Tx, the Tx transmitting section 20 transmits the synchronization Tx. Upon reception of the synchronization Txs, the pointer control circuits 45 set the values of the SWP registers 43 to "0" at time "8" in the chip 10-1, at time "8" in the chip 10-2, at time "3" in the chip 10-3, and at time "8" in the chip 10-4.

The synchronization Txs transmitted from the respective chips 10-1 to 10-4 reach the link receiving sections 31 of the receiving circuits 22-1 to 22-4 of the respective chips 10-1 to 10-4.

Upon reception of the synchronization Txs, the link receiving sections 31 output them to the pointer control circuits 35 and reception buffers 32. And the pointer control circuits 35 of the respective chips 10-1 to 10-4, which have received the synchronization Txs, set the values of the WP resisters 33 to "0" at time "15" in the receiving circuit 22-2 of the chip 10-1, at time "5" in the receiving circuit 22-3 of the chip 10-1, at time "10" in the receiving circuit 22-4 in the chip 10-1, at time "15" in the receiving circuit 22-1 of the chip 10-2, at time "6" in the receiving circuit 22-3 of the chip 10-2, at time "10" in the receiving circuit 22-4 in the chip 10-2, at time "10" in the receiving circuit 22-1 of the chip 10-3, at time "11" in the receiving circuit 22-2 of the chip 10-3, at time "10" in the receiving circuit 22-3 in the chip 10-3, at time "15" in the receiving circuit 22-1 of the chip 10-4, at time "10" in the receiving circuit 22-2 of the chip 10-4, and at time "8" in the receiving circuit 22-3 in the chip 10-4.

Upon reception of the synchronization Tx, the pointer control circuit 35 sets the value of the WP register 33 to "0" at this clock. The above processing is done in phase 2.

The time control circuit 24 then starts processing in phase 3. When the value of the SWP register 43 becomes "15", the time control circuit 24 checks whether any of the WP registers 33 indicates a negative value.

This processing is performed at time "23" in the chip 10-1, at time "23" in the chip 10-2, at time "18" in the chip 10-3, and at time "23" in the chip 10-4. In the chip 10-1, the WP register 33 of the receiving circuit 22-3 indicates "−6", and the WP register 33 of the receiving circuit 22-3 of the chip 10-2 indicates "−7".

At time "29" when the value of the WP register 33 of the receiving circuit 22-3 becomes "0", therefore, the time control circuit 24 of the chip 10-1 instructs the Tx transmitting section 20 to transmit a synchronization Tx. The time control circuit 24 of the chip 10-2 instructs the Tx transmitting section 20 to transmit the synchronization Tx at time "30" when the WP register 33 of the receiving circuit 22-3 is set to "0".

The pointer control circuits 45 in the chips 10-1 and 10-2 which have received the synchronization Txs set the SWP registers 43 to "0" at the same time. The pointer control circuits 35 of the receiving circuits 22-1 and 22-2 of the remaining chips 10-1 to 10-4 set the values of the WP registers 33 to "0" at the time points at which they receive the synchronization Txs. This processing is performed at time "37" in the receiving circuit 22-2 of the chip 10-1, at time "36" in the receiving circuit 22-1 of the chip 10-2, at time "31" in the receiving circuit 22-1 of the chip 10-3, at time "33" in the receiving circuit 22-2 of the chip 10-3, at time "32" in the receiving circuit 22-1 of the chip 10-4, and at time "36" in the receiving circuit 22-2 of the chip 10-4.

The time control circuits 24 of all the chips repeat the processing in phase 3 since they receive the synchronization Txs by the time the SWP registers 43 change from "−8" to "15", i.e., between times "24" and "44" in the chip 10-1, between times "24" and "45" in the chip 10-2, between times "19" and "42" in the chip 10-3, and between times "24" and "47" in the chip 10-4.

Since none of the WP registers 33 indicates a negative value at the time point the SWP register 43 becomes "15", i.e., at time "44" in the chip 10-1, at time "45" in the chip 10-2, at time "42" in the chip 10-3, and at time "47" in the chip 10-4, no processing is performed until the SWP register 43 becomes "15" next. Therefore, no synchronization Tx is transmitted or received until the SWP registers 43 change from "−8" to "15", i.e., between times "45" and "68" in the chip 10-1, between times "46" and "69" in the chip 10-2, between times "43" and "66" in the chip 10-3, and between times "48" and "71" in the chip 10-4. Consequently, the flow of processing shifts from phase 3 to phase 4.

When the flow of processing shifts to phase 4, i.e., the value of the SWP register 43 becomes "15", the time control circuit 24 checks whether any of the WP registers 33 indicates a value between "0" and "7". This processing is performed at time "68" in the chip 10-1, at time "69" in the chip 10-2, at time "66" in the chip 10-3, and at time "71" in the chip 10-4. In the chip 10-1, since the value of the WP register 33 of the receiving circuit 22-2 is "7", the time control circuit 24 outputs, to the Tx transmitting section 20, an instruction to transmit a time adjustment Tx, when the value of the SWP register 43 becomes the value "−1" obtained by subtracting "8" from "7". At this time, the time adjustment Tx additionally has information indicating that the Tx is addressed to the chip 10-2.

Upon reception of the time adjustment Tx, the pointer control circuit 35 of the receiving circuit 22-1 of the chip 10-2 notifies the time control circuit 24 of the reception of the Tx together with the value "−1" of the WP register 33 at this time point, because the time adjustment Tx is addressed to the chip 10-2. The pointer control circuits 35 of the remaining chips 10-3 and 10-4 notify the time control circuits 24 of the reception of the Txs together with the value "0", because the time adjustment Txs are not addressed to the chips 10-3 and 10-4. This processing is performed at time "83" in the chip 10-2, at time "78" in the chip 10-3, and at time "83" in the chip 10-4.

Upon reception of the time adjustment Txs, each time control circuit 24 stores one of the Txs which has the minimum value. In this case, the chip 10-2 holds the value "−1", and the remaining chips 10-3 and 10-4 hold the value "0". The time control circuits 24 of all the chips 10-1 to 10-4 issue instructions to transmit time adjustment Txs or receive the notifications of the reception of time adjustment Txs by the time the values of the SWP registers 43 change from "−8" to "15", and hence the flow of processing shifts to phase 5.

In phase 5, when the value of the SWP register 43 becomes the value stored in phase 4, the value of the SWP register 43 is set to "0". This processing is performed at time "101" in the chip 10-2, at time "99" in the chip 10-3, and at time "104" in the chip 10-4. Since the stored value is not "0", the time control circuit 24 of the chip 10-2 simultaneously instructs the Tx transmitting section 20 to transmit a synchronization Tx. The Tx transmitting section 20 transmits the synchronization Tx. Upon reception of this Tx, the pointer control circuit 45 sets the SWP register 43 to "0". The pointer control circuits 35 of the receiving circuits 22-2 of the remaining chips 10-1, 10-3, and 10-4, which have received the synchronization Txs, set the values of the WP registers 33 to "0" at time "108" in the chip 10-1, at time "104" in the chip 10-3, and at time "103" in the chip 10-4.

The time control circuits 24 of all the chips shift to phase 4 when the values of the SWP registers 43 become "15", i.e., at time "116" in the chip 10-1, at time "116" in the chip 10-2, at time "114" in the chip 10-3, and at time "119" in the chip 10-4.

When the flow of processing shifts to phase 4, each time control circuit 24 checks whether any of the WP registers 33 indicates a value between "0" and "7". Since none of the WP registers 33 of all the chips 10-1 to 10-4 indicates a value between "0" and "7", all the chips 10-1 to 10-4 perform no processing until the values of the SWP registers 43 become "15" next.

Since the time control circuits 24 do not receive the notification of the reception of the time adjustment Txs during this period, the time control circuits 24 check whether any of the WP registers 33 indicate a negative value, at time "140" in the chip 10-1, at time "140" in the chip 10-2, at time "138" in the chip 10-3, and at time "143" in the chip 10-4. Since none of the WP registers 33 indicates a negative value, the time control circuits 24 of the chips 10-1 to 10-3 shift to phase 6. The time control circuit 24 of the chip 10-4 shifts to phase 3 because the WP register 33 of the receiving circuit 22-2 indicates the negative value "−8".

The chip 10-4 which has shifted to phase 3 instructs the Tx transmitting section 20 to transmit a synchronization Tx, when the WP register 33 of the receiving circuit 22-2 becomes "0", i.e., at time "151". Upon reception of the instruction to transmit the synchronization Tx, the Tx transmitting section 20 transmits the synchronization Tx. The pointer control circuit 45 of the chip 10-3 which has received the Tx sets the value of the SWP register 43 to "0".

The synchronization Txs transmitted from the chip 10-4 reach the link receiving sections 31 of the receiving circuits 22-4 of the remaining chips 10-1 to 10-3 which have shifted to phase 6. The link receiving sections 31 which have received the synchronization Txs output them to the pointer control circuits 35 and reception buffers 32 at time "153" in the receiving circuit 22-4 of the chip 10-1, at time "153" in the receiving circuit 22-4 of the chip 10-2, and at time "153" in the receiving circuit 22-4 of the chip 10-3. Upon reception of the synchronization Txs, the pointer control circuits 35 set the values of the WP registers 33 to "0".

The time control circuits 24 of all the chips receive the synchronization Txs by the time the SWP registers 43 change from "−8" to "15", i.e., between times "141" and "164" in the chip 10-1, between times "141" and "164" in the chip 10-2, between times "139" and "162" in the chip 10-3, and between times "144" and "166" in the chip 10-4. Therefore, the chips 10-1 to 10-3 shift to phase 3, and the chip 10-4 repeats the processing in phase 3.

Since none of the WP registers 33 indicates a negative value when the SWP registers 43 become "15", i.e., at time "164" in the chip 10-1, at time "164" in the chip 10-2, at time "162" in the chip 10-3, and at time "166" in the chip 10-4, no processing is performed until the SWP registers 43 become "15" next. Therefore, no synchronization Tx is transmitted or received until the SWP registers 43 change from "−8" to "15", i.e., between times "165" and "188" in the chip 10-1, between times "165" and "188" in the chip 10-2, between times "163" and "186" in the chip 10-3, and between times "167" and "190" in the chip 10-4. Consequently, the flow of processing shifts from phase 3 to phase 4.

When the flow of processing shifts to phase 4, i.e., the value of the SWP register 43 becomes "15", each time control circuit 24 checks whether any of the WP registers 33 indicates a value between "0" and "7". This processing is performed at time "188" in the chip 10-1, at time "188" in the chip 10-2, at time "186" in the chip 10-3, and at time "190" in the chip 10-4. Since none of the WP registers 33 indicates a value between "0" and "7", no processing is performed until the SWP registers 43 become "15" next.

Since no instruction to transmit a time adjustment Tx is issued or no notification of reception is received until the SWP registers 43 change from "−8" to "15", i.e., between times "189" and "212" in the chip 10-1, between times "189" and "212" in the chip 10-2, between times "187" and "210" in the chip 10-3, and between times "191" and "214" in the chip 10-4, the flow of processing shifts from phase 4 to phase 6.

Since all the chips 10-1 to 10-4 shift to phase 6, the time control circuits 24 of the chips 10-1 to 10-4 receive no synchronization Tx until the values of the SWP register 43 become "15" again. The flow of processing therefore shifts to phase 7 at time "236" in the chip 10-1, at time "236" in the chip 10-2, at time "234" in the chip 10-3, and at time "238" in the chip 10-4.

The time control circuits 24 of all the chips 10-1 to 10-4 which have shifted to phase 7 set the values of the RP registers 34 and SRP registers 44 to "0" when the SWP registers 43 become "8". This processing is performed at time "253" in the chip 10-1, at time "253" in the chip 10-2, at time "251" in the chip 10-3, and at time "255" in the chip 10-4. In this manner, the synchronization processing is completed.

With the above processing, when the value of the SWP register 43 becomes "8", the value of the WP register 33 can take a value between "0" and "11" in phase 2, and will take a value between "1" and "8" when synchronization is completed by making adjustments in the subsequent phases.

The Tx output from the chip 10-1, for example, is written when the value of the SWP register 43 of the chip 10-1 coincides with the value of the WP register 33 of the receiving circuit 22-1 of each of the remaining chips 10-2 to 10-4. That is, the Tx written in the 0th entry in the reception buffer 42 of the chip 10-1 is written in the 0th entry in the reception buffer 32 of the receiving circuit 22-1 of each of the remaining chips 10-2 to 10-4. Since this applies to all the chips 10-1 to 10-4, if the arbitrating circuits 23 of all the chips 10-1 to 10-4 read out transactions from all the reception buffers 32 and 42 of the respective chips 10-1 to 10-4 for every cycle and order them, all the chips 10-1 to 10-4 can share the same order relationship.

As is obvious from the above description, this embodiment can implement the control processing system with a hardware amount smaller than that in the first embodiment as well as having the same effects as those of the first embodiment described above.

In the first embodiment, transactions are ordered by regarding the transmission delays among the respective chips as "$T_{max} \times 2 - T_{min}$". In contrast to this, in this embodiment, transactions are ordered by regarding the transmission delays among the respective chips as "$T_{max}$", and hence the transmission delays among the chips after synchronization processing become smaller to achieve higher performance.

[Third Embodiment]

Figure 12:
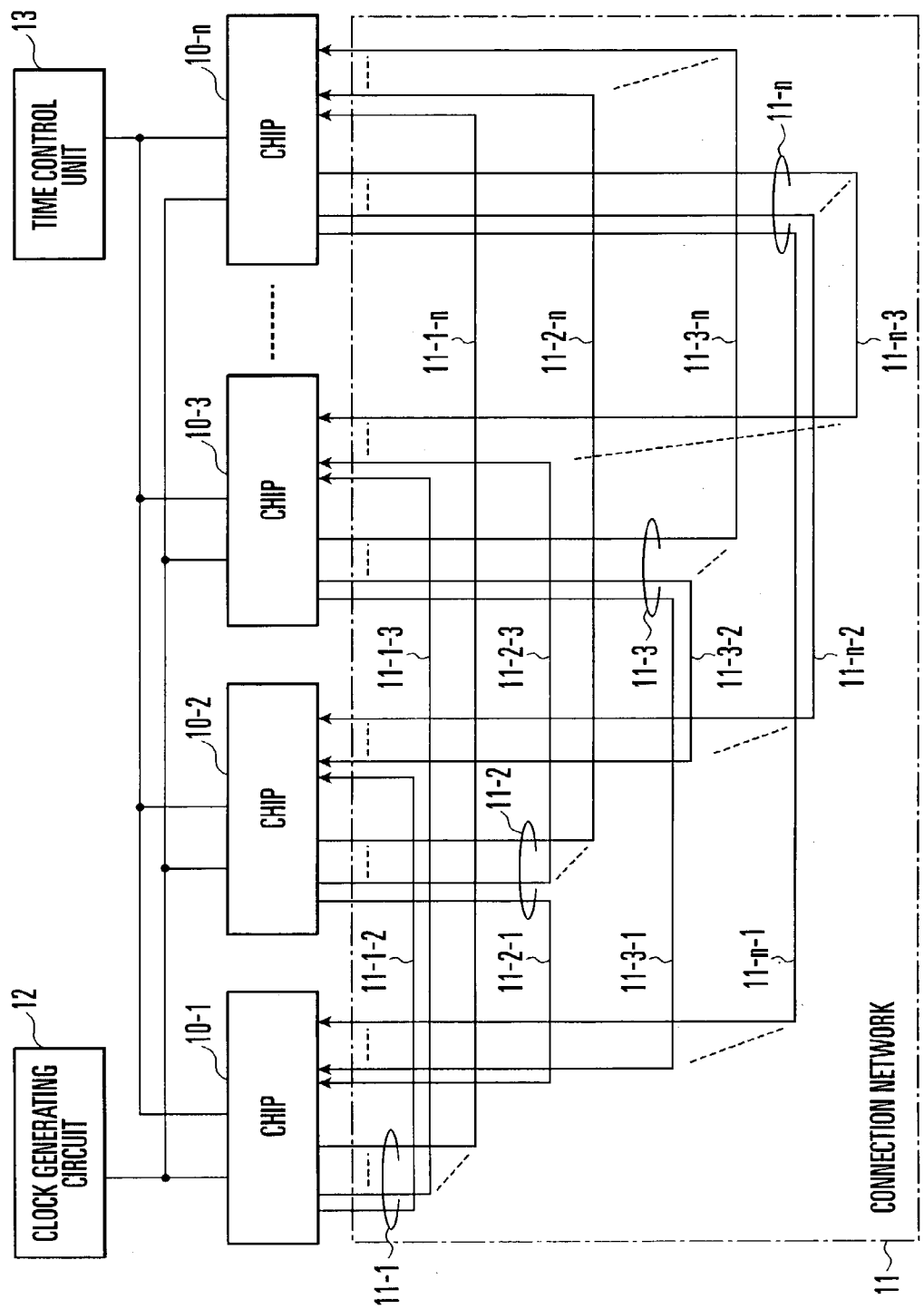
FIG. 12 is a block diagram showing the arrangement of a control processing system according to the third embodiment of the present invention.

A control processing system according to the third embodiment of the present invention will be described next with reference to FIG. 12. FIG. 12 shows the arrangement of the control processing system according to the third embodiment of the present invention.

This control processing system differs from that according to the first embodiment (FIG. 1) in that a time control unit 13 is added. This time control unit 13 is connected to chips 10-1 to 10-n and has a function of reading out internal information from the respective chips and a setting function.

Figure 13:
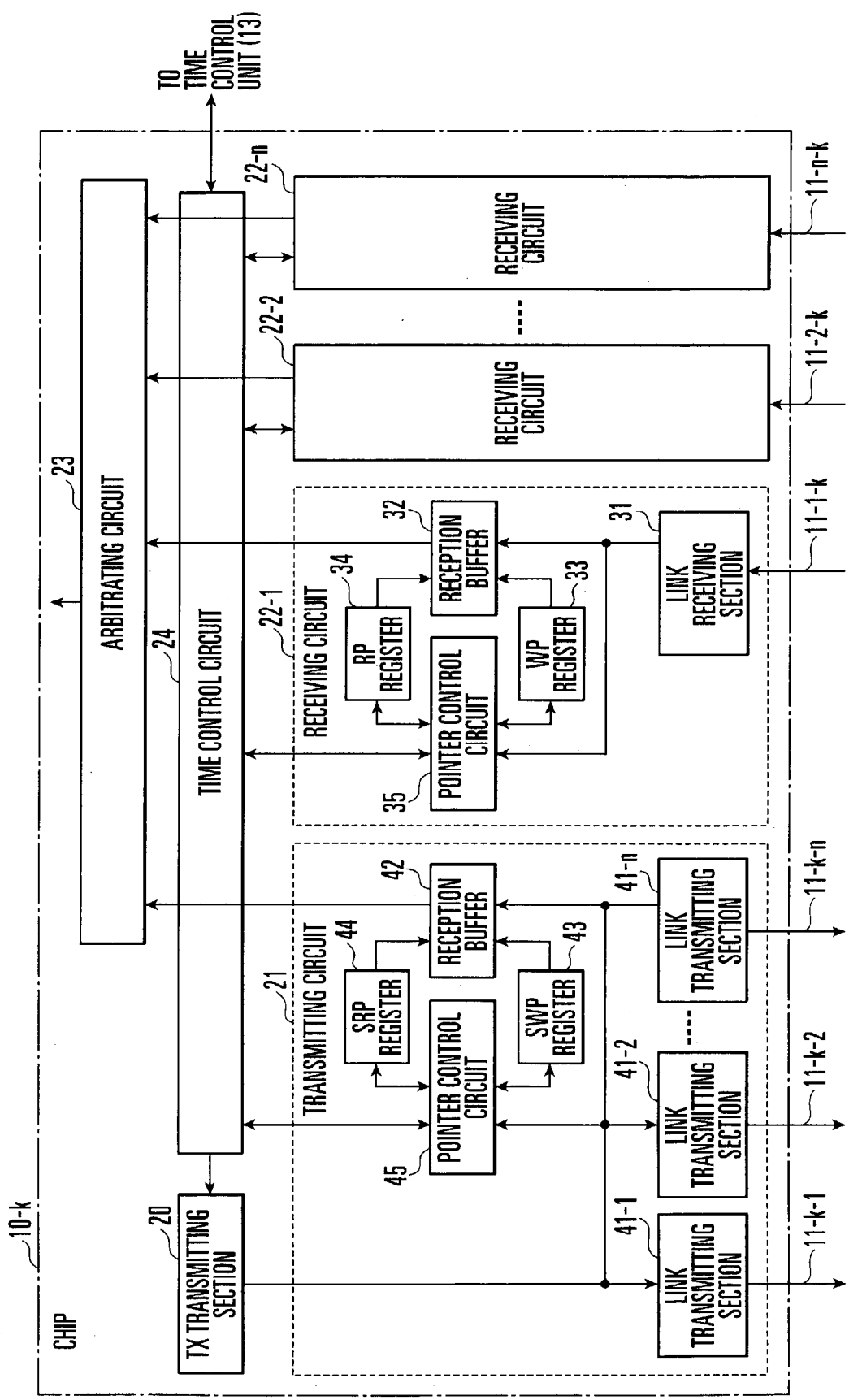
FIG. 13 is a block diagram showing an example of the arrangement of a chip used in the third embodiment.

FIG. 13 shows the arrangement of the chip 10-k of the system according to the third embodiment of the present invention.

The chip 10-k is comprised of a Tx transmitting section 20, transmitting circuit 21, receiving circuits 22-1 to 22-n (excluding 22-k), arbitrating circuit 23, and time control circuit 24, and has almost the same arrangement as that in the first embodiment except that the time control circuit 24 is connected to the time control unit 13.

In the third embodiment, the depth of each of reception buffers 32 and 42 is "$T_{max}+1$" as in the second embodiment. WP registers 33 and SWP registers 43 count from "$-(T_{max}+1)$" to "$2 \times T_{max}+1$". The RP registers 34 and SRP registers 44 count from "0" to "$T_{max}$". In writing data in each of the reception buffers 32 and 42, the data is written in the entry indicated by the remainder obtained by dividing the value of a corresponding one of the WP registers 33 and SWP registers 43 by "$T_{max}+1$".

The operation of the control processing system according to this embodiment will be described next.

Synchronization processing by the time control circuit 24 implements part of the following operation which is performed by the time control circuit 24.

[Phase 1]

On the chip 10-1, when synchronization of the respective reception buffers is to be done, the time control circuit 24 instructs the Tx transmitting section 20 to send out a synchronization start Tx. Upon reception of this instruction, the Tx transmitting section 20 sends out the synchronization start Tx. This Tx sent out from the Tx transmitting section 20 is transferred to the link transmitting sections 41-2 to 41-n and output to remaining chips 10-2 to 10-n via the link group 11-1 of the connection network 11.

On each of the chips 10-2 to 10-n, the link receiving section 31 of the receiving circuit 22-1 receives this synchronization start Tx. The link receiving sections 31 outputs this Tx to the pointer control circuit 35 and the reception buffer 32. Upon reception of this Tx, the pointer control circuit 35 notifies the time control circuit 24 of the reception of this Tx.

[Phase 2]

On the chip 10-1, "$T_{max}+1$" clocks after the sending of the synchronization start Tx, the time control circuit 24 instructs the Tx transmitting section 20 to send out a synchronization Tx.

On each of the chips 10-2 to 10-n, the time control circuit 24 receives the notification of the reception of the synchronization start Tx from the pointer control circuit 35, and instructs the Tx transmitting section 20 to send out a synchronization Tx.

On each of the chips 10-1 to 10-n, upon reception of the synchronization Tx from the Tx transmitting section 20, the pointer control circuit 45 sets the SWP register 43 to "0". And the link transmitting section 41 transmits this Tx from the Tx transmitting section 20 to the remaining chips 10.

These synchronization Txs are sent to all the link receiving sections 31 of all the chips 10-1 to 10-n via the connection network 11.

On each of the chips 10-1 to 10-n, each link receiving section 31 outputs the received synchronization Tx to the pointer control circuit 35 and reception buffer 32. Upon reception of the synchronization Tx, the pointer control circuit 35 sets the WP register 33 to "0".

[Phase 3]

During the execution of the synchronization processing, the time control unit 13 monitors the states of the respective chips 10-1 to 10-n to obtain information indicating to which phase the processing has progressed. Upon detecting that all the chips 10-1 to 10-n have completed the processing in phase 2, the time control unit 13 reads out the values of all the WP registers 33 at the time point the values of the SWP registers 43 are "$T_{max}$".

The time control unit 13 then creates an n x n matrix Z. The pth row/mth column element of the matrix Z is the value of the WP register 33 of the receiving circuit 22-m which is read out from the chip 10-p. Note that if p=m, "$T_{max}$" is set. The time control unit 13 performs the following time adjusting operation for the created matrix Z to obtain a time adjustment vector V. In this case, the initial value of the vector V is "0".

(Step 1)

The time control unit 13 obtains the maximum value of the elements on each row of the matrix Z, and creates a vector T having a length n and values as elements each of which is obtained by subtracting "$T_{max}$" from the corresponding maximum value. The time control unit 13 then performs the calculation represented by the following equations with respect to all the elements of the matrix Z except for diagonal elements and the time adjustment vector V:

$$Z[p][m]=Z[p][m]-T[p]+T[m] (p=1 \text{ to } n, m=1 \text{ to } n)$$

$$V[p]=V[p]-T[p] (p=1 \text{ to } n)$$

The processing from the creation of a vector T to calculation for the matrix Z and vector V is repeated until no value exceeding "$T_{max}$" exists in the matrix Z. When no value exceeds "$T_{max}$", the flow shifts to step 2".

(Step 2)

The time control unit 13 obtains the minimum value of elements having negative values for each row of the matrix Z, and creates a vector T having the length n and the obtained values as elements. If no negative value exists, "0" is set. The time control unit 13 then performs the calculation represented by the following equations with respect to all the elements of the matrix Z except for diagonal elements:

$$Z[p][m]=Z[p][m]+T[p]-T[m] (p=1 \text{ to } n, m=1 \text{ to } n)$$

$$V[p]=V[p]+T[p] (p=1 \text{ to } n)$$

The processing from the creation of a vector T to calculation for the matrix Z is repeated until no negative value exists in the matrix Z. When no negative value exists, the flow shifts to step 3".

(Step 3)

If an element having a value exceeding "$T_{max}$" exists in the matrix Z, the flow shifts to step 1. If no such element exists, the time adjusting operation is terminated.

The time control unit 13 notifies the respective chips 10-1 to 10-n of the respective elements of the vector V obtained by the above operation. The pth element of the vector V is notified to the chip 10-p.

[Phase 4]

On each of the chips 10-1 to 10-n, the arbitrating circuit 23 which has received the element of the vector V from the time control unit 13 instructs the Tx transmitting section 20 to transmit a synchronization Tx, when the value of the SWP register 43 coincides with the received value. The pointer control circuit 45 which has received the synchronization Tx sent out from the Tx transmitting section 20 sets the values of the SWP registers 43 to "0". At the same time, the link transmitting sections 41-1 to 41-n which have received the synchronization Txs transmit the synchronization Txs to the remaining chips 10-1 to 10-n.

Upon reception of the synchronization Tx via the connection network 11, each of the link receiving sections 31 outputs it to the pointer control circuit 35. Upon reception of the synchronization Tx, the pointer control circuit 35 sets the value of the WP register 33 to "0", and notifies the time control circuit 24 of the reception of the synchronization Tx.

If the time control circuit 24 has received the notifications of the reception of the synchronization Txs from all the receiving circuits 22-1 to 22-n and already has issued the instruction to transmit the synchronization Tx, the flow of processing shifts to phase 5.

[Phase 5]

On each of the chips 10-1 to 10-n, when the value of the SWP register 43 becomes "$T_{max}+1$", the value of the RP register 34 and SRP register 44 are set to "0", and the synchronization processing is completed.

With the above processing, when the value of the SWP register 43 becomes "$T_{max}+1$", the value of the WP register 33 can take a value between "$T_{min}-T_{max}+1$" and "$2\times(T_{max}-T_{min}+1)$" in phase 2 (a negative value indicates that the WP register 33 has not actually been set at this time point but will be set when the value becomes "0"), and will take a value between "1" and "$T_{max}+1$" when synchronization is completed by making adjustments in the subsequent phases.

The Tx output from each chip 10-k is written when the value of the SWP register 43 of the chip 10-k coincides with the value of the WP register 33 of the receiving circuit 22-k of each of the remaining chips 10-1 to 10-n. That is, the Tx written in the 0th entry in the reception buffer 42 of the chip 10-k is written in the 0th entry in the reception buffer 32 of the receiving circuit 22-k of each of the remaining chips 10-1 to 10-n. Since this applies to all the chips 10-1 to 10-n, if the arbitrating circuits 23 of all the chips 10-1 to 10-n read out transactions from all the reception buffers 32 and 42 of the respective chips 10-1 to 10-n for every cycle and order them, all the chips 10-1 to 10-n can share the same order relationship.

Figure 16:
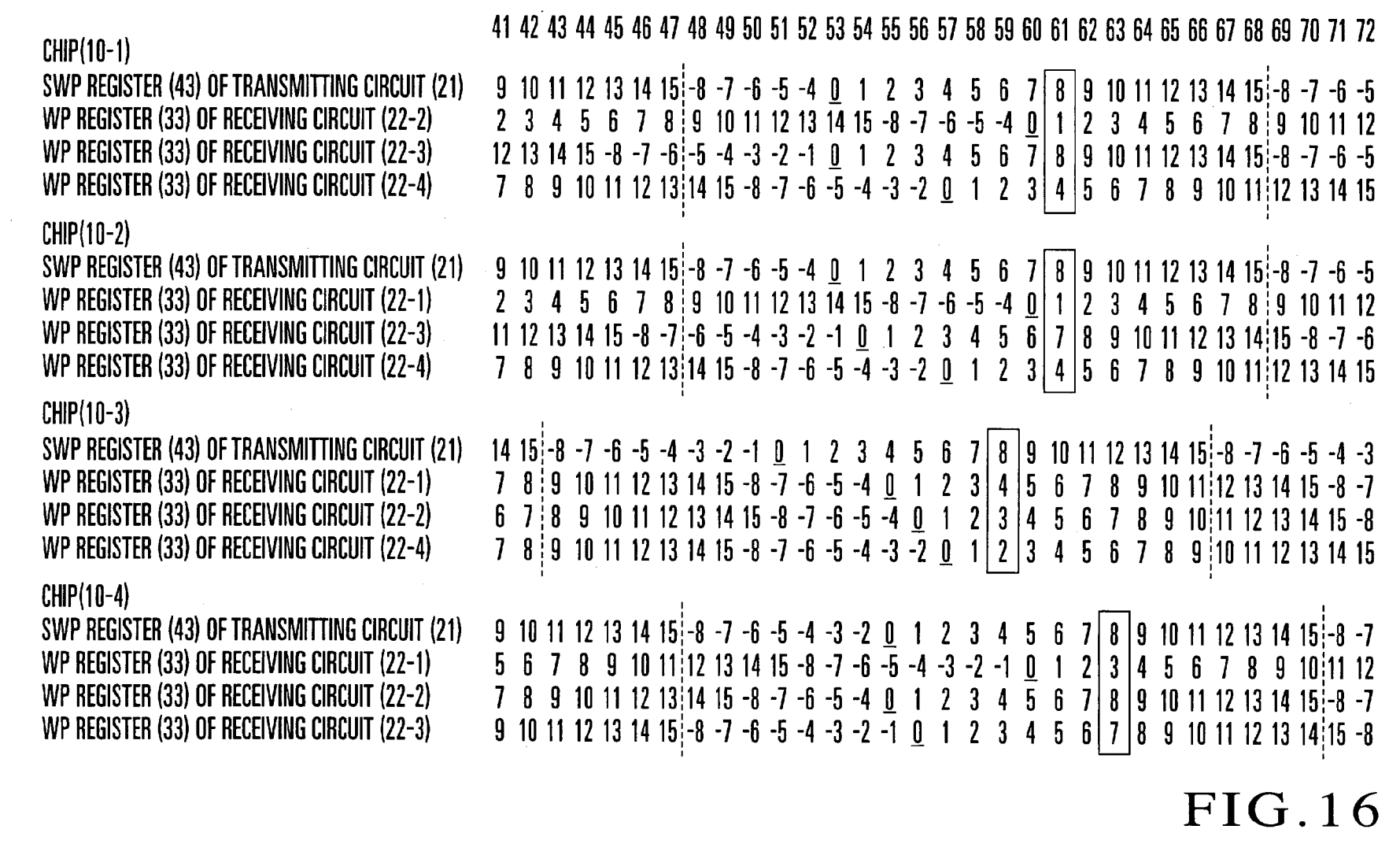

An example of the operation of this embodiment will be described next with reference to FIGS. 14 to 16. FIGS. 14 and 16 explain the transition of the values of the WP registers 33 and SWP registers 43 of the respective chips 10-1 to 10-4. FIG. 15 shows the values of matrix Z and time adjustment vector V created by operation in phase 3.

The control processing system according to this embodiment is comprised of the four chips 10-1 to 10-4. Assume that $T_{max}=7$ and $T_{min}=2$. The depth of the reception buffers 32 and 42 is "8". The WP registers 33 and SWP registers 43 count from "–8" to "15". The RP registers 34 and SRP registers 44 count from "0" to "7".

The operation up to phase 2 in FIG. 5 is the same as that in the second embodiment described above.

At time "0", the Tx transmitting section 20 of the chip 10-1 transmits a synchronization start Tx. The link receiving sections 31 of the receiving circuits 22-1 of the respective chips 10-2 to 10-4 output the Txs to the pointer control circuits 35 at time "7" in the chip 10-2, at time "2" in the chip 10-3, and at time "7" in the chip 10-4.

Upon reception of the Txs, the pointer control circuits 35 notify the time control circuits 24 of the reception. In addition, the pointer control circuits 35 set the values of the WP register 33 to "0" at time "8" in the chip 10-2, at time "3" in the chip 10-3, and at time "8" in the chip 10-4. Operation in phase 1 is done in the above manner.

Upon reception of the notifications of the reception of the synchronization start Txs, the time control circuits 24 instruct the Tx transmitting sections 20 to transmit synchronization Txs, at time "8" in the chip 10-2, at time "3" in the chip 10-3, and at time "8" in the chip 10-4.

At time "8" after the lapse of "8" clocks since the transmission of the synchronization start Tx, the time control circuit 24 of the chip 10-1 instructs the Tx transmitting section 20 to transmit a synchronization Tx.

Upon reception of the instruction to transmit the synchronization Tx, the Tx transmitting section 20 transmits the synchronization Tx. Upon reception of the synchronization Txs, the pointer control circuits 45 set the values of the SWP registers 43 to "0" at time "8" in the chip 10-1, at time "8" in the chip 10-2, at time "3" in the chip 10-3, and at time "8" in the chip 10-4.

The synchronization Txs transmitted from the respective chips 10-1 to 10-4 reach the link receiving sections 31 of the receiving circuits 22-1 to 22-4 of the chips 10-1 to 10-4.

Upon reception of the synchronization Txs, the link receiving sections 31 which have received the synchronization Txs output them to the pointer control circuits 35 and reception buffers 32. And the pointer control circuits 35 of the respective chips 10-1 to 10-4, which have received the synchronization Txs, set the values of the WP registers 33 to "0" at time "15" in the receiving circuit 22-2 of the chip 10-1, at time "5" in the receiving circuit 22-3 of the chip 10-1, at time "10" in the receiving circuit 22-4 in the chip 10-1, at time "15" in the receiving circuit 22-1 of the chip 10-2, at time "6" in the receiving circuit 22-3 of the chip 10-2, at time "10" in the receiving circuit 22-4 in the chip 10-2, at time "10" in the receiving circuit 22-1 of the chip 10-3, at time "11" in the receiving circuit 22-2 of the chip 10-3, at time "10" in the receiving circuit 22-3 in the chip 10-3, at time "15" in the receiving circuit 22-1 of the chip 10-4, at time "10" in the receiving circuit 22-2 of the chip 10-4, and at time "8" in the receiving circuit 22-3 in the chip 10-4.

Upon reception of the synchronization Tx, the pointer control circuit 35 sets the value of the WP register 33 to "0" at this clock. The above processing is done in phase 2.

During the execution of the synchronization processing, the time control unit 13 monitors the states of the respective chips 10-1 to 10-4 to obtain information indicating to which phase the processing has progressed. Upon detecting that all the chips 10-1 to 10-4 have completed the processing in phase 2, the time control unit 13 reads out the values of all the WP registers 33 at the time point the values of the SWP registers 43 are "7". The time control unit 13 then creates a 4×4 matrix Z. The values read out from the respective chips 10-1 to 10-n are the value at time "23" in the chip 10-1, at time "23" in the chip 10-2, at time "18" in the chip 10-3, and at time "23" in the chip 10-4.

The time control unit 13 obtains a time adjustment vector V by performing time adjusting operation for the created matrix Z. Referring to FIG. 14, the values on the left side of the arrow are the initial values of the matrix Z, and the values on the right side are those of the matrix Z and time adjustment vector V obtained by time adjusting operation.

When the values of the time adjustment vector V are obtained, the time control unit 13 notifies the time control circuits 24 of the respective chips 10-1 to 10-4 of the elements. More specifically, the time control unit 13 notifies the chips 10-1 to 10-4 of "−3", "−3", "0", and "−1", respectively.

Upon reception of the notifications, the time control circuits 24 output, to the Tx transmitting sections 20, instructions to transmit synchronization Txs, when the values of the SWP registers 43 coincide with notified values. In this case, this processing is performed at time "53" in the chip 10-1, at time "53" in the chip 10-2, at time "51" in the chip 10-3, and at time "55" in the chip 10-4. As a result, the values of the SWP registers 43 are set to "0", as shown in FIG. 16.

Each time control circuit 24 outputs an instruction to transmit a synchronization Tx, receives the notifications of the reception of synchronization Txs from all the receiving circuits 22-1 to 22-n, and sets the values of the RP register 34 and SRP register 44 to "0" when the value of the SWP register 43 becomes "8". This processing is performed at time "61" in the chip 10-1, at time "61" in the chip 10-2, at time "59" in the chip 10-3, and at time "63" in the chip 10-4. With this operation, the synchronization processing is completed.

With the above, when the value of the SWP register 43 becomes "8", the value of the WP register 33 can take a value between "0" and "11" in phase 2, and will take a value between "1" and "8" when synchronization is completed by making adjustments in the subsequent phases.

The Tx output from the chip 10-1, for example, is written when the value of the SWP register 43 of the chip 10-1 coincides with the value of the WP register 33 of the receiving circuit 22-1 of each of the remaining chips 10-2 to 10-4. That is, the Tx written in the 0th entry in the reception buffer 42 of the chip 10-1 is written in the 0th entry in the reception buffer 32 of the receiving circuit 22-1 of each of the remaining chips 10-2 to 10-4. Since this applies to all the chips 10-1 to 10-4, if the arbitrating circuits 23 of all the chips 10-1 to 10-4 read out transactions from all the reception buffers 32 and 42 of the respective chips 10-1 to 10-4 for every cycle and order them, all the chips 10-1 to 10-4 can share the same order relationship.

As is obvious from the above description, according to this embodiment, the same effects as those of the second embodiment described above can be obtained. In addition, most of the complicated control for synchronization processing among the chips in the second embodiment is implemented by the time control unit 13 in this embodiment, and hence no complicated control among the chips is required.

[Fourth Embodiment]

A control processing system according to the fourth embodiment of the present invention will be described next.

The arrangement of the system according to this embodiment is almost the same as that of the first embodiment described above (see FIG. 1).

Figure 17:
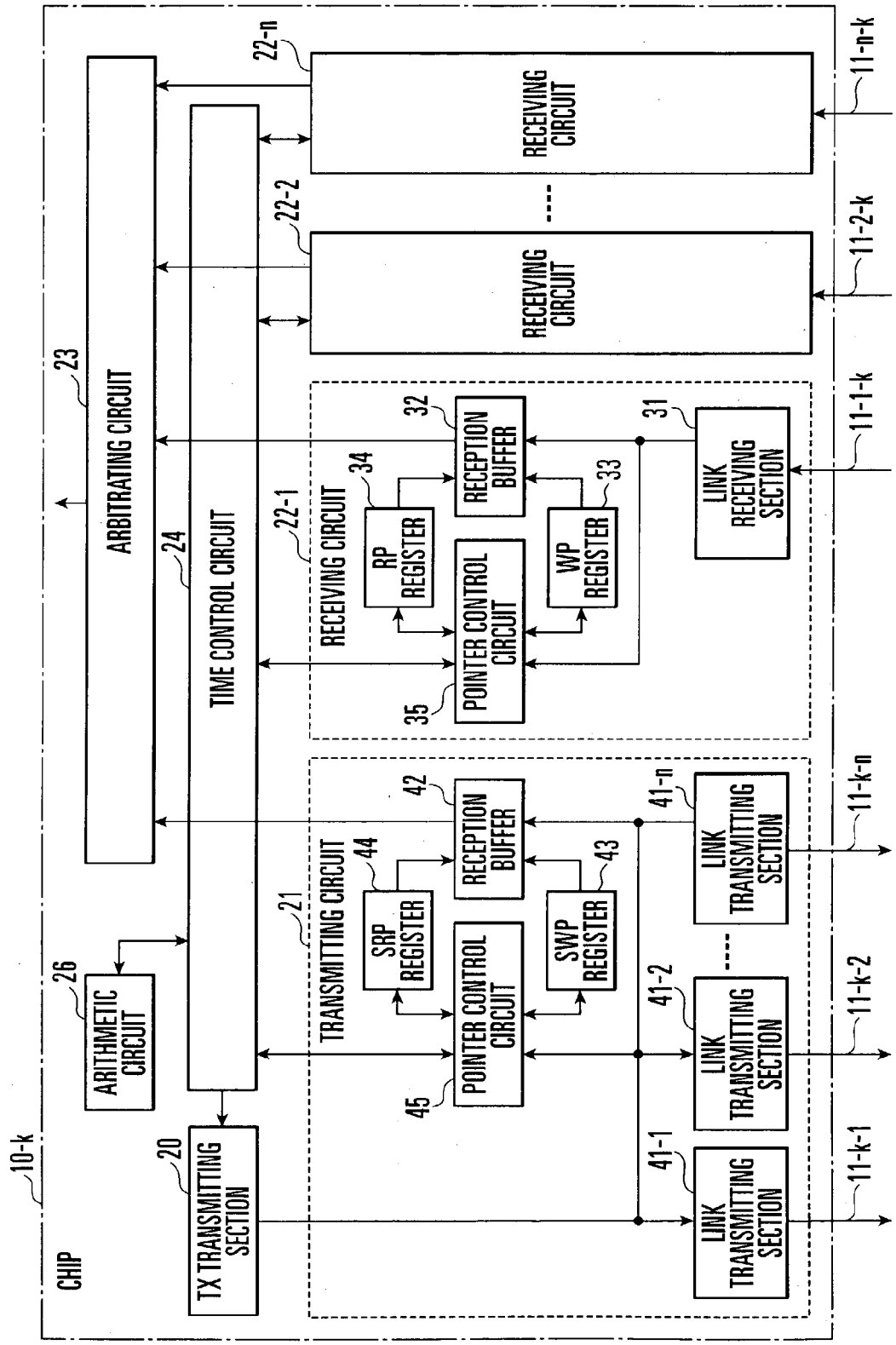
FIG. 17 a block diagram showing an example of the arrangement of a chip used in the fourth embodiment.

FIG. 17 shows the arrangement of a chip 10-k of the system according to the fourth embodiment of the present invention.

The chip 10-k is comprised of a Tx transmitting section 20, transmitting circuit 21, receiving circuits 22-1 to 22-n (excluding 22-k), arbitrating circuit 23, and time control circuit 24. Unlike in the first embodiment, an arithmetic circuit 26 is connected to the time control circuit 24. The arithmetic circuit 26 has a function of controlling the time control circuit 24 and reading out the information obtained by the time control circuit 24.

In this embodiment, the depth of each of reception buffers 32 and 42 is "$T_{max}+1$" as in the second and third embodiments described above. WP registers 33 and SWP registers 43 count from "$-(T_{max}+1)$" to "$2 \times T_{max}+1$". RP registers 34 and SRP registers 44 count from "0" to "$T_{max}$". In writing data in each of the reception buffers 32 and 42, the data is written in the entry indicated by the remainder obtained by dividing the value of a corresponding one of the WP registers 33 and SWP registers 43 by "$T_{max}+1$".

The operation of this embodiment will be described next.

Synchronization processing by the time control circuit 24 implements part of the following operation which is performed by the time control circuit 24. The synchronization start Tx, synchronization Tx, and time information Tx are used in the following operation.

[Phase 1]

On the chip 10-1, when synchronization of the respective reception buffers is to be done, the time control circuit 24 instructs the Tx transmitting section 20 to send out a synchronization start Tx. Upon reception of this instruction, the Tx transmitting section 20 sends out the synchronization start Tx. This Tx sent out from the Tx transmitting section 20 is transferred to the link transmitting sections 41-2 to 41-n and output to remaining chips 10-2 to 10-n via the link group 11-1 of the connection network 11.

On each of the chips 10-2 to 10-n, the link receiving section 31 of the receiving circuit 22-1 receives this synchronization start Tx. The link receiving sections 31 outputs this Tx to the pointer control circuit 35 and the reception buffer 32. Upon reception of this Tx, the pointer control circuit 35 notifies the time control circuit 24 of the reception of this Tx.

[Phase 2]

On the chip 10-1, "$T_{max}+1$" clocks after the sending of the synchronization start Tx, the time control circuit 24 instructs the Tx transmitting section 20 to send out a synchronization Tx.

On each of the chips 10-2 to 10-n, the time control circuit 24 receives the notification of the reception of the synchronization start Tx from the pointer control circuit 35, and instructs the Tx transmitting section 20 to send out a synchronization Tx.

On each of the chips 10-1 to 10-n, upon reception of the synchronization Tx from the Tx transmitting section 20, the pointer control circuit 45 sets the SWP register 43 to "0". And the link transmitting section 41 transmits this Tx from the Tx transmitting section 20 to the remaining chips 10.

These synchronization Txs are sent to all the link receiving sections 31 of all the chips 10-1 to 10-n via the connection network 11.

On each of the chips 10-1 to 10-n, each link receiving section 31 outputs the received synchronization Tx to the pointer control circuit 35 and reception buffer 32. Upon reception of the synchronization Tx, the pointer control circuit 35 sets the WP register 33 to "0".

[Phase 3]

On each of the chips 10-1 to 10-n, upon reception of the notification of the reception of the synchronization Txs from all the receiving circuits 22-1 to 22-n, the time control circuit 24 reads out, via the pointer control circuits 35, the values of the (n−1) WP registers 33 at the time point the value of the SWP register 43 becomes "$T_{max}$", and instructs the Tx transmitting section 20 to transmit a time information Tx to which the values of the (n−1) WP registers 33 are added. In addition, these values are stored in the time control circuit 24.

The time information Txs reach the receiving circuits 22-1 to 22-n of the remaining chips 10-1 to 10-n via the Tx transmitting sections 20, link transmitting sections 41-1 to 41-n, and connection network 11.

On each of the chips 10-1 to 10-n, upon reception of the time information Tx, each of the link receiving sections 31 outputs it to the pointer control circuit 35. The pointer control circuit 35 outputs the notification of the reception of the time information Tx to the time control circuit 24, together with the values of the WP registers 33 which are added to the Tx.

The time control circuit 24 also internally stores the values of the WP registers 33 of the remaining chips 10-1 to 10-n which are obtained by receiving the time information Txs from all the receiving circuits 22-1 to 22-n.

With the above processing, the values of the WP registers 33 of all the chips 10-1 to 10-n at the time point the values of the SWP registers 43 are "$T_{max}$" are collected in the time control circuits 24 of all the chips 10-1 to 10-n.

On each of the chips 10-1 to 10-n, upon reception of all the time information Txs, the time control circuit 24 transfers the internally held values of the WP registers 33 to the arithmetic circuit 26. The arithmetic circuit 26 creates a matrix Z based on the information as in the same manner the time control unit 13 in the third embodiment.

As in the third embodiment, a time adjustment vector V is obtained from the created matrix Z. Finally, in the chip 10-k, the kth element of the vector V is output to the time control circuit 24.

[Phase 4]

On each of the chips 10-1 to 10-n, upon reception of the element of the vector V from the arithmetic circuits 26, the time control circuits 24 instructs the Tx transmitting section 20 to transmit a synchronization Tx, when the value of the SWP register 43 coincide with the received value. Upon reception of the synchronization Tx sent out from the Tx transmitting section 20, the pointer control circuit 45 sets the value of the SWP register 43 to "0". At the same time, the link transmitting sections 41-1 to 41-n which have received the synchronization Txs transmit the synchronization Txs to the remaining chips 10-1 to 10-n.

On each of the chips 10-1 to 10-n, each of the link receiving sections 31 outputs it to the pointer control circuit 35. Upon reception of the synchronization Tx, the pointer control circuit 35 sets the value of the WP register 33 to "0", and notifies the time control circuit 24 of the reception of the synchronization Tx.

If the time control circuit 24 has received the notifications of the reception of the synchronization Txs from all the receiving circuits 22-1 to 22-n and has already output an instruction to transmit the synchronization Tx, the flow of processing shifts to phase 5.

[Phase 5]

On each of the chips 10-1 to 10-n, when the value of the SWP register 43 becomes "$T_{max}+1$", the values of the RP register 34 and SRP register 44 are set to "0", thus completing the synchronization processing.

With the above processing, when the value of the SWP register 43 becomes "$T_{max}+1$", the value of the WP register 33 can take a value between "$T_{min}-T_{max}+1$" and "$2\times(T_{max}-T_{min})+1$" in phase 2 (a negative value indicates that the WP register 33 has not actually been set at this time point but will be set when the value becomes "0"), and will take a value between "1" and "$T_{max}+1$" when synchronization is completed by making adjustments in the subsequent phases.

The Tx output from each chip 10-k is written when the value of the SWP register 43 of the chip 10-k coincides with the value of the WP register 33 of the receiving circuit 22-k of each of the remaining chips 10-1 to 10-n. That is, the Tx written in the 0th entry in the reception buffer 42 of the chip 10-k is written in the 0th entry in the reception buffer 32 of the receiving circuit 22-k of each of the remaining chips 10-1 to 10-n. Since this applies to all the chips 10-1 to 10-n, if the arbitrating circuits 23 of all the chips 10-1 to 10-n read out transactions from all the reception buffers 32 and 42 of the respective chips 10-1 to 10-n for every cycle and order them, all the chips 10-1 to 10-n can share the same order relationship.

As is obvious from the above description, according to this embodiment, the same effects as those of the second embodiment described above can be obtained. In addition, most of the complicated control for synchronization processing among the chips in the second embodiment is implemented by the arithmetic unit 26 in this embodiment, and hence no complicated control among the chips is required.

In addition, since processing similar to that in the third embodiment is performed by using the respective arithmetic circuits 26 instead of using a single time control unit 13 like the one used in the third embodiment, a system resistant to troubles can be realized.

[Fifth Embodiment]

Figure 18:
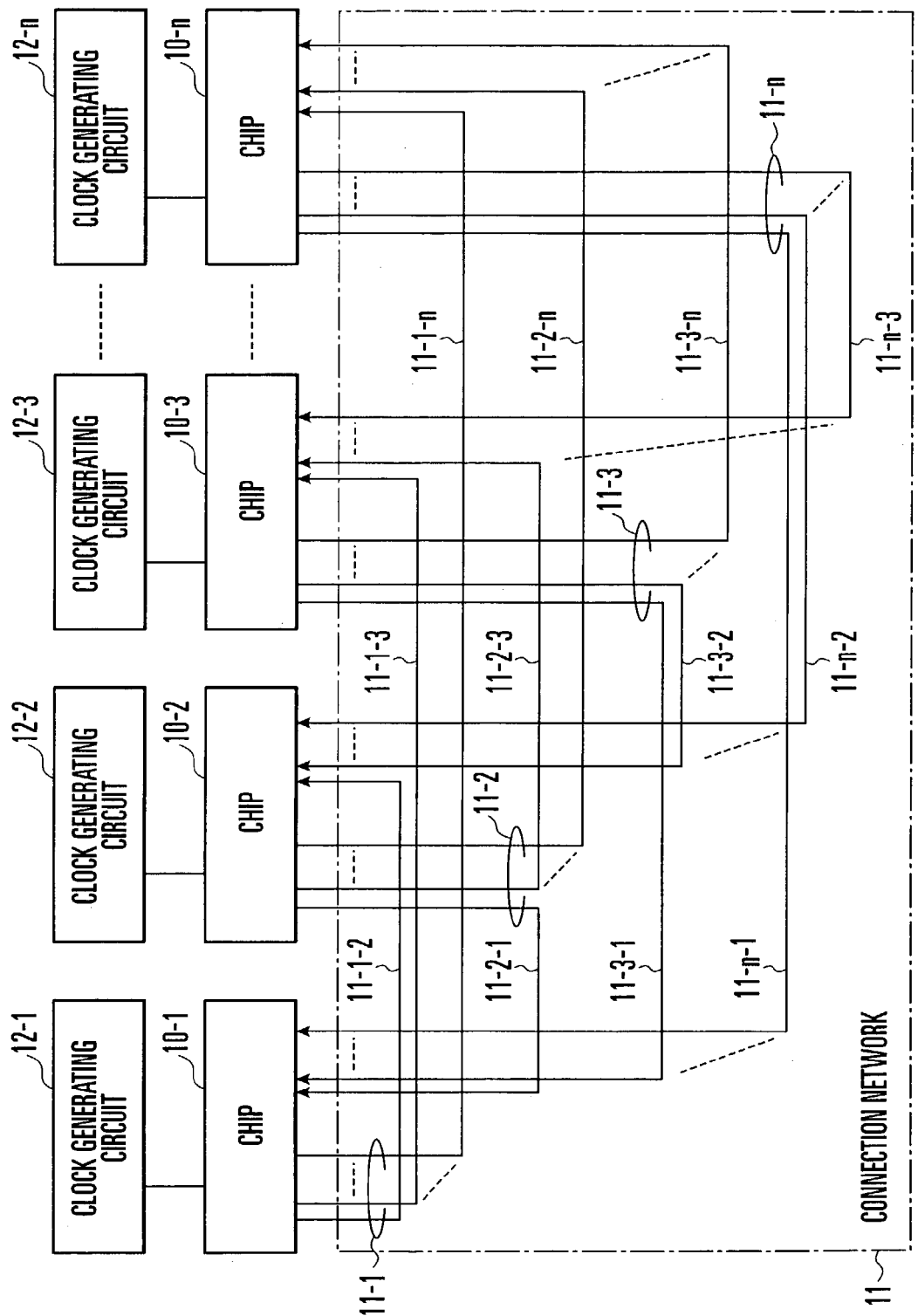
FIG. 18 a block diagram showing an example of the arrangement of a chip used in the fifth embodiment.
Figure 19:
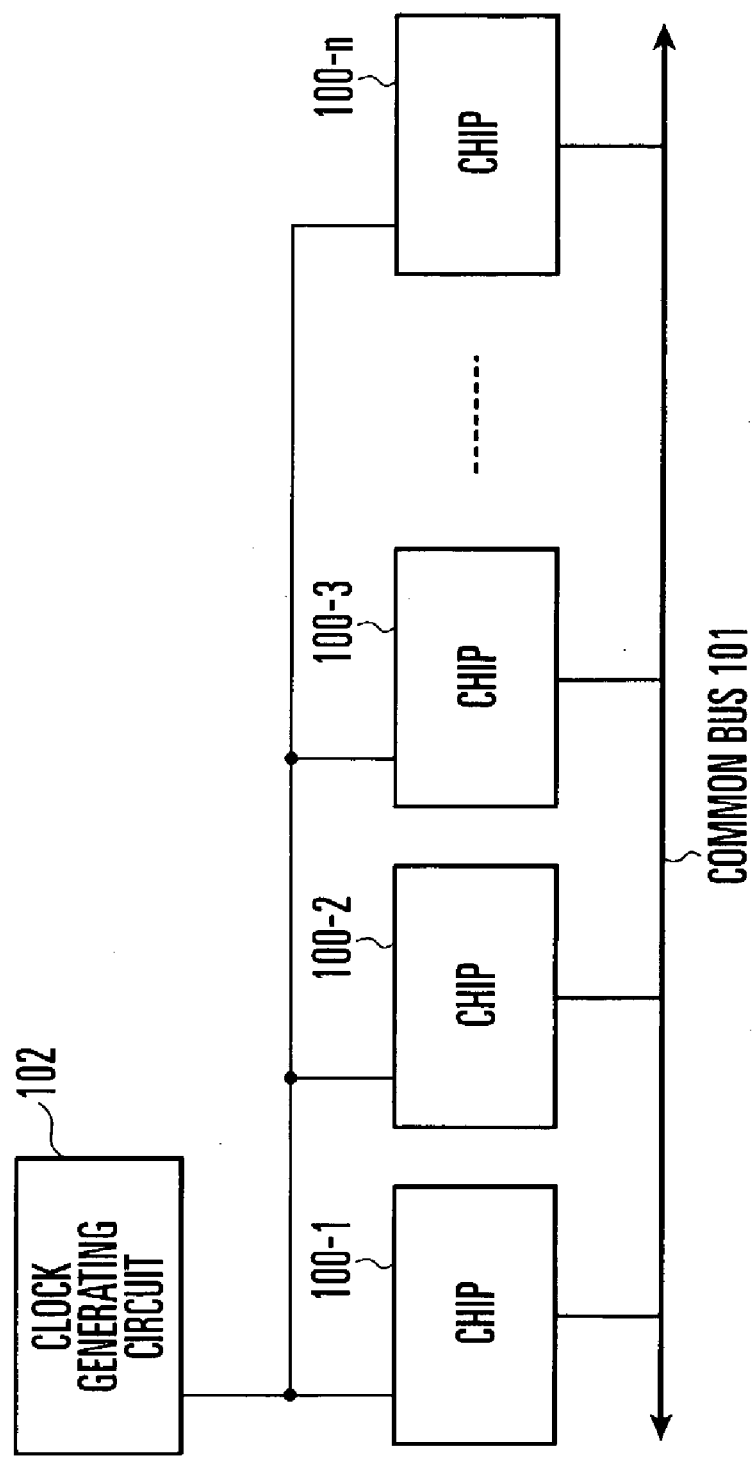
FIG. 19 is a block diagram showing the arrangement of a conventional control processing system.

A control processing system according to the fifth embodiment of the present invention will be described next with reference to FIG. 18. FIG. 18 shows the arrangement of the system according to the fifth embodiment of the present invention.

This control processing system has a plurality of chips 10-1 to 10-n coupled to each other via a unidirectional, one-to-one connection network 11. Clocks output from clock generating circuits 12-1 to 12-n are respectively input to the chips 10-1 to 10-n. Transmission delays on links 11-1-2 to 11-n-(n−1) of the connection network 11 can differ from each other. However, the maximum and minimum values of transmission delays are known in the design stage.

The arrangement of the chip 10-k in this embodiment is the same as the chip arrangement (see FIG. 2) in the first embodiment described above. Note, however, that the depth of reception buffers 42 is "$T_{max} \times 2 - T_{min} + 1 + t$", and the depth of reception buffers 32 is "$(T_{max} - T_{min}) \times 3 + 1 + 2t$". SWP registers 43 and SRP registers 44 count from "0" to "$T_{max} \times 2 - T_{min} + t$". WP registers 33 and RP registers 34 count from "0" to "$(T_{max} - T_{min}) \times 3 + 2t$" where t is a natural number.

Txs according to this embodiment include a synchronization start request Tx in addition to synchronization start Tx, and synchronization Tx.

The operation of the control processing system according to this embodiment will be described next. Of the following operation, the portion performed by the time control circuit 24 is implemented by synchronization processing by the time control circuit 24.

[Phase 1]

On the chip 10-1, when synchronization of the respective reception buffers is to be done, the time control circuit 24 instructs the Tx transmitting section 20 to send out a synchronization start Tx. Upon reception of this instruction, the Tx transmitting section 20 sends out the synchronization start Tx. This Tx sent out from the Tx transmitting section 20 is transferred to the link transmitting sections 41-2 to 41-n and output to remaining chips 10-2 to 10-n via the link group 11-1 of the connection network 11.

On each of the chips 10-2 to 10-n, the link receiving section 31 of the receiving circuit 22-1 receives this synchronization start Tx. The link receiving sections 31 outputs this Tx to the pointer control circuit 35 and the reception buffer 32. Upon reception of this Tx, the pointer control circuit 35 notifies the time control circuit 24 of the reception of this Tx.

[Phase 2]

On the chip 10-1, "$T_{max} + 1$" clocks after the sending of the synchronization start Tx, the time control circuit 24 instructs the Tx transmitting section 20 to send out a synchronization Tx.

On each of the chips 10-2 to 10-n, the time control circuit 24 receives the notification of the reception of the synchronization start Tx from the pointer control circuit 35, and instructs the Tx transmitting section 20 to send out a synchronization Tx.

On each of the chips 10-2 to 10-n, upon reception of the synchronization Tx from the Tx transmitting section 20, the pointer control circuit 45 sets the SWP register 43 to "0". And the link transmitting section 41 transmits this Tx from the Tx transmitting section 20 to the remaining chips 10.

These synchronization Txs are sent to all the link receiving sections 31 of all the chips 10-1 to 10-n via the connection network 11.

On each of the chips 10-1 to 10-n, each link receiving section 31 outputs the received synchronization Tx to the pointer control circuit 35 and reception buffer 32. Upon reception of the synchronization Tx, the pointer control circuit 35 sets the WP register 33 to "0".

[Phase 3]

On each of the chips 10-1 to 10-n, the time control circuit 24 sets the RP register 34 and SRP register 44 to "0" at the time point the SWP register 43 becomes "0" again, i.e., "$T_{max} \times 2 + 1 - T_{min} + t$" clocks after the instruction to transmit the synchronization Tx is output on phase 2.

With the above operation, the synchronization processing in phase 3 is completed.

With the above processing, in all the chips 10-1 to 10-n, the synchronization Txs are written in the 0th entries in the reception buffers 32 and 42, and are output to the arbitrating circuits 23 when the RP registers 34 and SRP registers 44 are set to "0". In the reception buffers 32 and 42, the Txs issued by the corresponding chips 10-1 to 10-n are written for every cycle. More specifically, the Tx issued in the next cycle to the synchronization Tx is written in the 1st entry, and the Tx issued two cycles after the synchronization Tx is written in the 2nd entry.

When the value of the RP register 34 is set to "0", the WP register 33 takes a value between "$1+t$" and "$(T_{max} - T_{min}) \times 3 + 1 + t$". That is, the reception buffer 32 stores "$1+t$" Txs or more or has a free space corresponding to "t" Txs or more. The arbitrating circuit 23 can extract Txs from the arbitrating circuit 23 for every clock until there is no free space in the reception buffer 32 or no Tx can be written therein owing to the differences in frequency between clocks.

The pointer control circuit 35 monitors the difference between the WP register 33 and the RP register 34. If the value of the WP register 33 becomes equal to the value obtained by adding one to the value of the RP register 34, or the value of the WP register 33 becomes equal to the value of the RP register 34, the pointer control circuit 35 notifies the time control circuit 24 of the corresponding information.

In the chip 10-1, upon reception of the notification, the time control circuit 24 starts synchronization processing again. In the remaining chips 10-2 to 10-n, the time control circuits 24 output, to the Tx transmitting sections 20, instructions to transmit synchronization start request Txs. Upon reception of the synchronization start request Txs, the link receiving sections 31 of the chip 10-1 notify the time control circuit 24 of the reception via the pointer control circuits 35. Upon reception of the notifications, the time control circuit 24 of the chip 10-1 starts synchronization processing again.

By performing synchronization processing again, the reception buffer 32 stores "$1+t$" Txs or more or has a free space.

As is obvious from the above description, according to this embodiment, in addition to the effects of the first embodiment described above, all transactions exchanged among the respective chips can be processed in the same order in all chips even in a system in which the respective chips are connected to each other via a connection network constituted by one-to-one connection links, and the respective chips have separate clock generating circuits.

[Modifications of Embodiments]

The present invention is not limited to the first to fifth embodiments described above, and can be variously modified. For example, the following modifications can be made.

[First Modification of Embodiments]

For example, processed based on the matrix Z performed by the time control unit 13 and arithmetic circuit 26 in the third and fourth embodiments may be constituted by the following steps.

(Step 1)

The minimum value of elements having negative values is obtained for each row of the matrix Z, and a vector T having a length n and the obtained values as elements is created. If no negative value exists, "0" is set. The calculation represented by the following equations is performed for all the elements of the matrix Z except for diagonal elements:

$$Z[p][m] = Z[p][m] - T[p] + T[m] \quad (p=1 \text{ to } n, m=1 \text{ to } n)$$

$$V[p] = V[p] - T[p] \quad (p=1 \text{ to } n)$$

The processing from the creation of a matrix T to calculation for the matrix Z and vector V is repeated until no negative value exists in the matrix Z. When no negative value exists, the flow shifts to step 2".

(Step 2)

The maximum value of elements of the matrix Z is obtained for each row, and a vector T having a length n and the values, as elements, which are obtained by subtracting "$T_{max}$" from the maximum values is created. The calculation represented by the following equations is then performed for all the elements of the matrix Z except for diagonal elements and a time adjustment vector V:

$$Z[p][m]=Z[p][m]+T[p]-T[m](p=1 \text{ to } n, m=1 \text{ to } n)$$

$$V[p]=V[p]-T[p](p=1 \text{ to } n)$$

The processing from the creation of a vector T to calculation for the matrix Z and vector V is repeated until no value exceeding "$T_{max}$" exists in the matrix Z. When no such value exists, the flow shifts to step 3".

(Step 3)

If an element having a negative value exists in the matrix Z, the flow shifts to step 1. If no such element exists, the time adjusting operation is terminated.

[Second Modification of Embodiments]

The third and fourth embodiments can be modified as follows.

The following step is added to the processing for the matrix Z performed in phase 3 by the time control unit 13 and arithmetic circuit 26, and the minimum value of the matrix Z is added to the data to be notified finally by the time control unit 13 and arithmetic circuit 26. In addition, the processing performed by the time control circuit 24 in phase 5 is modified in the following manner.

(Step 4)

After all the values fall within the range of "0" (inclusive) to "$T_{max}$" (inclusive), it is sequentially checked from the first row to nth row of the matrix Z whether an element having the value "0" exists in each row, no element having the value "$T_{max}$" exists in the same row, except for diagonal elements, and no element having the value "0" exists in the column (for example, if checking pth row then checks pth column). If all the conditions are true, the calculation represented by the following equation is performed. The following equations are used when the condition becomes true on the pth row. The calculation is performed for all the elements except for the diagonal elements.

$$Z[p][m]=Z[\ ][m]+1(m=1 \text{ to } n)$$

$$Z[m][p]=Z[m][p]-1(m=1 \text{ to } n)$$

$$V[p]=V[p]+1$$

(Step 5)

The minimum value of the created matrix Z is checked.

The time control unit 13 in the third embodiment and the arithmetic circuit 26 in the fourth embodiment notify each of the chips 10-1 to 10-n of the respective elements of the vector V and the minimum value of the matrix Z which are obtained by the above operation. The pth element of the vector V is notified to the chip 10-p.

In phase 5, when the value of the SWP register 43 becomes the value obtained by subtracting the received minimum value of the matrix Z from "$T_{max}+1$", the time control circuit 24 sets the values of the RP register 34 and SRP register 44 to "0", thereby completing the synchronization processing.

According to another modification, the pth element of the vector V and the minimum value of the pth row of the matrix Z can be notified to the chip 10-p by checking the minimum value of each row in step 5.

[Third Modification of Embodiments]

The fifth embodiment is a modification of the first embodiment. The clock generating circuits 12-1 to 12-n are respectively connected to the chips 10-1 to 10-n. The fifth embodiment includes the means for absorbing the differences in frequency between clocks generated by the respective clock generating circuits 12-1 to 12-n.

A similar modification can be made to the second, third, and fourth embodiments. In addition, a means for absorbing the differences in frequency between clocks is not limited to the one described in the fifth embodiment.

[Fourth Modification of Embodiments]

The first to fifth embodiments have exemplified the case wherein as the connection network 11 for mutually connecting the respective chips 10-1 to 10-n, the links 11-1-2 to 11-n-(n−1) for providing unidirectional, one-to-one connection for the respective chips are used among the respective chips. However, the present invention is not limited to this. A connection network having a different arrangement can also be used as long as it uses links for virtually providing unidirectional, one-to-one connection.

In this case, "links for virtually providing unidirectional, one-to-one connection" are links which allow transactions to be exchanged between chips without causing any congestion with transactions transmitted from other chips. That is, any links can be used unless the time required for a transaction transmitted from an arbitrary chip to arrive at a chip on the receiving side changes due to transactions transmitted from other chips. Such links include, for example, one-to-many connection links as well as the above unidirectional, one-to-one connection links.

As has been described above, according to the present invention, transactions are transmitted from the transmitting circuit of each control processing apparatus to other control processing apparatuses via the connection network, and the transactions are held in the home reception buffer. The respective receiving circuits of each control processing apparatus receives transactions from other control processing apparatuses via the connection network, and the transactions are held in the reception buffers. The arbitrating circuit of each control processing apparatus orders the transactions read out from the home reception buffer and the respective reception buffers and output them. At this time, predetermined transmissions are exchanged among the respective control processing apparatuses, and the transmitting and receiving circuits set write and read entries corresponding to the transmission delays between the home control processing apparatuses and the remaining control processing apparatuses so as to control the read and write timings in the home reception buffer and the respective reception buffers. This allows each control processing apparatus to process the transactions in the same order.

The transactions exchanged among the respective control processing apparatuses can be processed in the same order in all the control processing apparatuses without using a single bus or a single clock generating circuit.

What is claimed is:

1. A system control method used in a control processing system which has a plurality of control processing apparatuses mutually connected via a connection network and performs control in cooperation with the respective control processing apparatuses by causing the respective control processing apparatuses to issue transactions containing various instructions as needed, the method being adapted to process the transactions in the respective control processing apparatuses in the same order, and the method comprising steps of:

- transmitting a transaction from the control processing apparatus to remaining control processing apparatuses via the connection network, and holding the transaction in a home reception buffer through a transmitting circuit;
- receiving transactions transmitted from the corresponding control processing apparatuses via the connection network, and holding the transactions in reception buffers through receiving circuits provided in correspondence with the respective remaining control processing apparatuses, and
- ordering transactions read out from the home reception buffer and the respective reception buffers and outputting the transactions through an arbitrating circuit, and
- exchanging predetermined transactions among the respective control processing apparatuses, and determining specific entries in which received transactions should be written and specific entries from which transactions should be output to the arbitrating circuit through the transmitting circuit and the receiving circuits, thereby setting identical combinations of transactions which the arbitrating circuit is to read out from the home reception buffer and the plurality of reception buffers in all the control processing apparatuses.

2. A control processing system which has a plurality of control processing apparatuses mutually connected via a connection network and performs control in cooperation with said respective control processing apparatuses by causing said respective control processing apparatuses to issue transactions containing various instructions as needed, wherein each of said control processing apparatuses comprises a transmitting circuit which transmits a transaction from said control processing apparatus to remaining control processing apparatuses via the connection network, and holds the transaction in a home reception buffer, receiving circuits which are provided in correspondence with the respective remaining control processing apparatuses, receive transactions transmitted from said corresponding control processing apparatuses via the connection network, and hold the transactions in reception buffers, and an arbitrating circuit which orders transactions read out from the home reception buffer and the respective reception buffers and outputs the transactions, and predetermined transactions are exchanged among said respective control processing apparatuses, and said transmitting circuit and the receiving circuits determine specific entries in which received transactions should be written and specific entries from which transactions should be output to the arbitrating circuit, thereby setting identical combinations of transactions which the arbitrating circuit is to read out from the home reception buffer and the plurality of reception buffers in all the control processing apparatuses.

3. A control processing apparatus used in a control processing system which has a plurality of control processing apparatuses mutually connected via a connection network and performs control in cooperation with said respective control processing apparatuses by causing said respective control processing apparatuses to issue transactions containing various instructions as needed, comprising:

a transmitting circuit which transmits a transaction from said control processing apparatus to remaining control processing apparatuses via the connection network, and holds the transaction in a home reception buffer, receiving circuits which are provided in correspondence with the respective remaining control processing apparatuses, receive transactions transmitted from said corresponding control processing apparatuses via the connection network, and hold the transactions in reception buffers, and an arbitrating circuit which orders transactions read out from the home reception buffer and the respective reception buffers and outputs the transactions, wherein predetermined transactions are exchanged among said respective control processing apparatuses, and said transmitting circuit and the receiving circuits determine specific entries in which received transactions should be written and specific entries from which transactions should be output to the arbitrating circuit, thereby setting identical combinations of transactions which the arbitrating circuit is to read out from the home reception buffer and the plurality of reception buffers in all the control processing apparatuses.

* * * * *